(12) United States Patent
Cesafsky et al.

(10) Patent No.: US 11,755,008 B2
(45) Date of Patent: Sep. 12, 2023

(54) USING PLAYS FOR HUMAN-AI DECISION-MAKING IN REMOTE AUTONOMOUS VEHICLE SUPPORT

(71) Applicant: Nissan North America, Inc., Franklin, TN (US)

(72) Inventors: Laura Cesafsky, San Francisco, CA (US); Astha Vagadia, San Jose, CA (US); Hillary Abraham, Irvine, CA (US); Sparsh Sharma, Santa Clara, CA (US); Stefan Witwicki, San Carlos, CA (US); Najamuddin Mirza Baig, San Jose, CA (US); Omar Bentahar, Sunnyvale, CA (US)

(73) Assignees: Nissan North America, Inc., Franklin, TN (US); Renault S.A.S., Boulogne-Billancourt (FR)

( * ) Notice: Subject to any disclaimer, the term of this patent is extended or adjusted under 35 U.S.C. 154(b) by 612 days.

(21) Appl. No.: 16/779,393

(22) Filed: Jan. 31, 2020

(65) Prior Publication Data
US 2021/0240191 A1     Aug. 5, 2021

(51) Int. Cl.
    *G05D 1/00*     (2006.01)
(52) U.S. Cl.
    CPC ......... *G05D 1/0016* (2013.01); *G05D 1/0038* (2013.01); *G05D 1/0088* (2013.01); *G05D 2201/0212* (2013.01)
(58) Field of Classification Search
    None
    See application file for complete search history.

(56) References Cited

U.S. PATENT DOCUMENTS

| 7,303,010 B2 | 12/2007 | de Guzman et al. |
| 8,271,132 B2 | 9/2012 | Nielsen et al. |
| 2007/0067145 A1 | 3/2007 | Miller et al. |

(Continued)

OTHER PUBLICATIONS

Funk et al., A PlaybookTM for Real-Time, Closed-Loop Control; Engineering 2006; 7 pages https://www.semanticscholar.org/paper/A-Playbook-TM-for-Real-Time%2C-Closed-Loop-Control-Funk-Goldman/389407db8bd54638db7cc1e798fb7bbb2e74c0f3.

(Continued)

*Primary Examiner* — Anne Marie Antonucci
*Assistant Examiner* — Amelia Vorce
(74) *Attorney, Agent, or Firm* — Young Basile Hanlon & MacFarlane, P.C.

(57) ABSTRACT

An apparatus for traversing a vehicle transportation network by an autonomous vehicle (AV) includes a human-autonomy teaming manager. The manager includes a first processor configured to initiate a dialogue associated with a predefined dynamic task sequence that is responsive to a condition experienced by the AV while traversing from a starting location to an ending location within the vehicle transportation network. The sequence is one of a plurality of predefined dynamic task sequences that uses multiple agents to resolve the condition. The manager receives, from an interface accessible to a human agent, an input responsive to the dialogue. The input confirms the sequence as a selected predefined dynamic task sequence or selects an other of the plurality of predefined dynamic task sequences as the selected predefined dynamic task sequence. The manager delegates tasks of the selected predefined dynamic task sequence to resolve the condition.

20 Claims, 11 Drawing Sheets

(56) References Cited

U.S. PATENT DOCUMENTS

| | | | | |
|---|---|---|---|---|
| 2010/0312388 | A1* | 12/2010 | Jang | G05D 1/0088 700/248 |
| 2017/0090480 | A1* | 3/2017 | Ho | G05D 1/0027 |
| 2018/0011485 | A1* | 1/2018 | Ferren | G05D 1/0088 |
| 2019/0019349 | A1* | 1/2019 | Dolgov | G05D 1/0044 |
| 2019/0079659 | A1* | 3/2019 | Adenwala | H04W 4/44 |
| 2019/0163176 | A1* | 5/2019 | Wang | G05D 1/0027 |
| 2019/0227569 | A1* | 7/2019 | Weslosky | G07C 5/0808 |
| 2020/0004241 | A1* | 1/2020 | Levinson | G05D 1/0027 |
| 2020/0062267 | A1* | 2/2020 | Magzimof | B60W 60/005 |
| 2020/0209845 | A1* | 7/2020 | Chen | G05D 1/0038 |
| 2020/0272949 | A1* | 8/2020 | Chen | G05D 1/0276 |
| 2020/0406914 | A1* | 12/2020 | Zhang | B60W 60/0054 |
| 2021/0048814 | A1* | 2/2021 | Ghorbanian-Matloob | G05D 1/0016 |
| 2021/0078595 | A1* | 3/2021 | Magzimof | G07C 5/008 |

OTHER PUBLICATIONS

Ho et al., Application of Human-Autonomy Teaming to an Advanced Ground Station for Reduced Crew Operations; 2017 IEEE/AIAA 36th Digital Avionics Systems Conference (DASC), St. Petersburg, FL, 2017, pp. 1-4; https://ieeexplore.ieee.org/document/8102124.

Brandt et al., A Human-Autonomy Teaming Approach for a Flight—Following Task; Advances in Intelligent Systems and Computing • Jun. 2018; 11 pages; https://www.researchgate.net/publication/318182691_A_Human-Autonomy_Teaming_Approach_for_a_Flight-Following_Task.

Endsley et al., From Here to Autonomy: Lessons Learned From Human-Automation Research; Human Factors; vol. 59, No. 1, Feb. 2017, pp. 5-27; 23 pages.

Goldman et al., Optimizing to Satisfice: Using Optimization to Guide Users; Proc. AHS International Specialists' Meeting on Unmanned Rotorcraft; Phoenix, AZ, Jan. 18-20, 2005; 10 pages.

* cited by examiner

| NAME OF SEQUENCE | ON-ROAD SCENARIOS | SCENARIO CHARACTERISTICS | AI UNCERTAINTIES | INPUTS |
|---|---|---|---|---|
| OVERTAKE WHEN SAFE | Lane Obstruction | • Partial Path Blockage<br>• Visibility OK<br>• Path OK | • Legitimate Obstructant? (Is it OK to "break double yellow" to try to pass obstacle?) | • Assess Obstruction Status (e.g. Passable)<br>• [Label Obstruction Category] |
| EDGE & OVERTAKE | Lane Obstruction | • Partial Path Blockage<br>• Visibility Poor<br>• Path OK | • Legitimate Obstructant? AND<br>• OK to Edge (Like This) for More Visibility? | • Assess Obstruction Status<br>• [Label Obstruction Category]<br>• Assess Likelihood of Vehicles in "Blind Spot" |
| PATH ASSIST & OVERTAKE | Lane Obstruction | • Partial Path Blockage<br>• Visibility OK<br>• Path Issues | • Legitimate Obstructant? AND<br>• OK Path to Overtake? OR/AND •<br>Can I Fit in This Passage? OR/AND<br>• OK to Be More Aggressive? | • Assess Obstruction Status<br>• [Label Obstruction Category]<br>• Assist with Direction and Speed of Teleop Path |
| WAIT BEHIND | Dynamic Full Obstruction | • Full Path Blockage<br>• Scene is Moving<br>• Reroute Impractical | • Legitimate Obstructant? AND<br>• Should I Wait for it to Clear? | • Assess Obstruction Status<br>• [Label Obstruction Category]<br>• Estimate Time to Clear ("Movability") |
| REROUTE | Static Full Obstruction | • Full Path Blockage<br>• Scene NOT Moving<br>• AV Near Intersection | • Legitimate Obstructant? AND<br>• Should I Try to Go Another Way? | • Assess Obstruction Status<br>• [Label Obstruction Category]<br>• Estimate Time to Clear ("Movability")<br>• OK Reroute Maneuver (e.g. U-Turns) |
| ASSESS & RESPOND | • Human Obstruction<br>• Reversing Obstruction<br>• Hardware Malfunction<br>• Other | • Human/Bicyclist Obstructant OR • Obstructant is moving toward AV OR •<br>No other sequences are appropriate | • Legitimate Obstructant?<br>• What is Proper Course of Action? | • Assess Obstruction Status<br>• [Label Obstruction Category]<br>• Respond Appropriately |

USING PLAYS FOR HUMAN-AI DECISION-MAKING IN REMOTE AUTONOMOUS VEHICLE SUPPORT

TECHNICAL FIELD

This disclosure relates generally to autonomous vehicle operational management and autonomous driving, and more particularly to remote support of autonomous vehicles.

BACKGROUND

A vehicle, such as an autonomous vehicle, may traverse a portion of a vehicle transportation network (e.g., a road). Traversing the portion of the vehicle transportation network may include generating or capturing, such as by a sensor of the vehicle, data, such as data representing an operational environment, or a portion thereof, of the vehicle. Traversing the portion of the vehicle transportation network may include performing an action of autonomous driving in response to the captured data. Remote assistance support may be used in the decision-making process of the action to be taken.

SUMMARY

Disclosed herein are aspects, features, elements, implementations, and embodiments that use plays for human-artificial intelligence (AI) decision-making in remote autonomous vehicle support and an explanation and control interface design that may be used for interacting with a human agent.

An aspect of the disclosed embodiments is an apparatus for traversing a vehicle transportation network by an AV. The apparatus includes a human-autonomy teaming manager with a first processor configured to initiate a dialogue associated with a predefined dynamic task sequence that is responsive to a condition experienced by the AV while traversing from a starting location to an ending location within the vehicle transportation network, wherein the predefined dynamic task sequence is one of a plurality of predefined dynamic task sequences that delegates tasks to multiple agents to resolve the condition. The first processor is also configured to receive, from an interface accessible to a human agent of the multiple agents, an input responsive to the dialogue, wherein the input confirms the predefined dynamic task sequence as a selected predefined dynamic task sequence or selects an other predefined dynamic task sequence of the plurality of predefined dynamic task sequences as the selected predefined dynamic task sequence. The first processor is configured to manage the selected predefined dynamic task sequence to resolve the condition.

Another apparatus for traversing a vehicle transportation network by an AV includes an autonomous mobility agent and a human-autonomy teaming manager. A first processor of the autonomous mobility agent is configured to receive a request for remote assistance support from the AV responsive to a condition observed by the AV while traversing from a starting location to an ending location within the vehicle transportation network. A second processor of the human-autonomy teaming manager is configured to initiate a dialogue associated with a predefined dynamic task sequence that is one of a plurality of predefined dynamic task sequences using multiple agents to resolve the condition, the multiple agents including a human agent and the autonomous mobility agent, present the dialogue to the human agent at a user interface of the human-autonomy teaming manager, receive, from the interface, an input responsive to the dialogue, wherein the input confirms the predefined dynamic task sequence as a selected predefined dynamic task sequence or selects an other predefined dynamic task sequence of the plurality of predefined dynamic task sequences as the selected predefined dynamic task sequence, and manage the selected predefined dynamic task sequence by delegating tasks of the selected predefined dynamic task sequence to resolve the condition. The first processor is configured to, responsive to the request, call the human-autonomy teaming manager to select the predefined dynamic task sequence.

Another aspect of the disclosed embodiments is a method for traversing a vehicle transportation network by an AV. The method includes initiating, by a first processor of a human-autonomy teaming manager, a dialogue associated with a predefined dynamic task sequence that is responsive to a condition experienced by the AV while traversing from a starting location to an ending location within the vehicle transportation network, wherein the predefined dynamic task sequence is one of a plurality of predefined dynamic task sequences using multiple agents to resolve the condition, receiving, from an interface accessible to a human agent of the multiple agents, an input responsive to the dialogue, wherein the input confirms the predefined dynamic task sequence as a selected predefined dynamic task sequence or selects an other predefined dynamic task sequence of the plurality of predefined dynamic task sequences as the selected predefined dynamic task sequence, and managing, by the first processor, the selected predefined dynamic task sequence to resolve the condition.

Variations in these and other aspects, features, elements, implementations, and embodiments of the methods, apparatus, procedures, and algorithms disclosed herein are described in further detail hereafter.

BRIEF DESCRIPTION OF THE DRAWINGS

The various aspects of the methods and apparatuses disclosed herein will become more apparent by referring to the examples provided in the following description and drawings in which like reference numbers refer to like elements.

FIG. 5 is a table that includes a list of available predefined dynamic task sequences for use when a condition observed by the autonomous vehicle is an obstruction.

DETAILED DESCRIPTION

Figure 1:
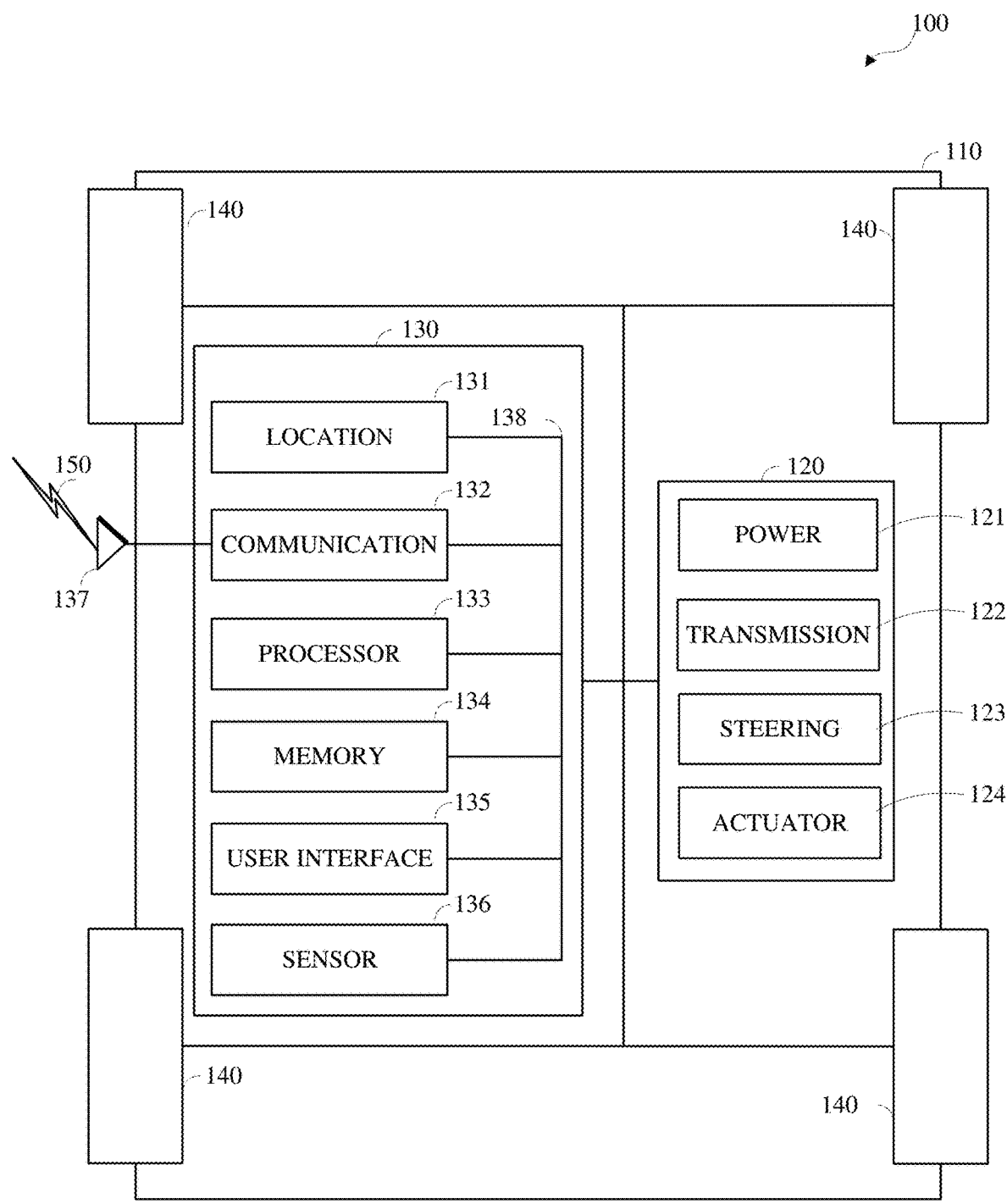
FIG. 1 is a diagram of an example of a vehicle in which the aspects, features, and elements disclosed herein may be implemented.

A vehicle, such as an autonomous vehicle (AV), or a semi-autonomous vehicle, may traverse a portion of a vehicle transportation network. The vehicle may include one or more sensors and traversing the vehicle transportation network may include the sensors generating or capturing sensor data, such as sensor data corresponding to an operational environment of the vehicle, or a portion thereof. For example, the sensor data may include information corresponding to one or more external objects, such as pedestrians, remote vehicles, other objects within the vehicle operational environment, vehicle transportation network geometry, or a combination thereof. As used herein, an AV encompasses a semi-autonomous vehicle, or any other vehicle capable of operating responsive to a remote instruction as discussed below.

During autonomous driving, and at different time steps (e.g., at every time step), some component (e.g., a decision-making module such as a reasoning module, an inference module, or the like) of the AV may determine a respective action for controlling the AV in response to sensor information. Thus, at a high level, the component of the AV uses inputs (e.g., sensor data) and produces an output (e.g., the action to control the AV) where the output can be an action for controlling the AV.

The component can be a single component (e.g., module, circuitry, etc.), multiple cooperating components, or a command arbitration module (e.g., an executor or an autonomous vehicle operational management controller) that receives inputs (e.g., candidate actions) from multiple components and selects one of the candidate actions as the selected action for controlling the AV.

A condition may be observed or experienced by the AV while traveling from a starting location to an ending location that triggers remote assistance support. In remote assistance support, for a use case class (e.g., a class of related conditions), a brief description of the condition or problem may be generated (e.g., using a ticket) along with a small dedicated interface for interacting with the AV. Maps and camera views may also be displayed using the interface. The interface for AV interaction allows an operator at the remote assistance support to review data, manipulate tools, and make decisions relevant to a given condition. For example, the operator may draw a path for an obstruction use case, or verify detected behavior for in-cabin monitoring. A final action decision is made from, e.g., an arbitrary, list of actions.

The above approach is ad-hoc, in that there is no routine for dealing with similar use case classes. This lack of routine can slow response time for the condition observed by the AV. Further, this approach may not distribute tasks efficiently between operators and the artificial intelligence (AI) of the remote assistance support. This is in part due to an operator failing to understand the capabilities and intentions of the AI. For example, an operator may not understand what "human input" the AI specifically needs.

Described herein are techniques that improve system efficiency and reduce response time in remote autonomous vehicle support. They incorporate a concept similar to that referred to as "plays" for human-AI decision-making. Plays have been described as compressed commands for multi-agent systems, wherein the actions taken by all agents conform to the shared goal of resolving a condition or problem. In this way, the predefined dynamic task sequences described herein are similar to plays. A predefined dynamic task sequence may be an encapsulated set of interactive behaviors—including alternative branches of behavior triggered by events, sub-actions and sub-decisions along the progress of the sequence—that allows a shared goal to be accomplished. The possible variations while executing the sequence is why the task sequences are referred to as dynamic. The task sequences are predefined and stored for use. Particular benefits to remote support of autonomous vehicles may be achieved in the control architecture by elevating the AI (referred to as the human-autonomy teaming manager herein) as the "chief supervisor" that delegates tasks to other actors or agents—bringing them into the processing for particular tasks as specified in the particular predefined dynamic task sequence selected to address or otherwise resolve a condition that resulted in the call for remote support assistance. That is, once a predefined dynamic task sequence initiates, the human-autonomy teaming manager orchestrates or otherwise manages the sequence by directing the responsibilities, interactions, and dependencies among relevant actors or agents, the human agent, the AV, other AVs in a fleet, data sources like infrastructure and map layers, and other human agents at the location of the AV (customers, emergency personnel, etc.).

Details of the predefined dynamic task sequences and their use in remote support of AVs are described in detail below starting with a description of an AV with which the invention may be used.

FIG. 1 is a diagram of an example of a vehicle in which the aspects, features, and elements disclosed herein may be implemented. As shown, a vehicle 100 includes a chassis 110, a powertrain 120, a controller 130, and wheels 140. Although the vehicle 100 is shown as including four wheels 140 for simplicity, any other propulsion device or devices, such as a propeller or tread, may be used. In FIG. 1, the lines interconnecting elements, such as the powertrain 120, the controller 130, and the wheels 140, indicate that information, such as data or control signals, power, such as electrical power or torque, or both information and power, may be communicated between the respective elements. For example, the controller 130 may receive power from the powertrain 120 and may communicate with the powertrain 120, the wheels 140, or both, to control the vehicle 100, which may include accelerating, decelerating, steering, or otherwise controlling the vehicle 100.

As shown, the powertrain 120 includes a power source 121, a transmission 122, a steering unit 123, and an actuator 124. Other elements or combinations of elements of a powertrain, such as a suspension, a drive shaft, axles, or an exhaust system may be included. Although shown separately, the wheels 140 may be included in the powertrain 120.

The power source 121 may include an engine, a battery, or a combination thereof. The power source 121 may be any device or combination of devices operative to provide energy, such as electrical energy, thermal energy, or kinetic energy. For example, the power source 121 may include an engine, such as an internal combustion engine, an electric motor, or a combination of an internal combustion engine and an electric motor, and may be operative to provide kinetic energy as a motive force to one or more of the wheels 140. The power source 121 may include a potential energy unit, such as one or more dry cell batteries, such as nickel-cadmium (NiCd), nickel-zinc (NiZn), nickel metal hydride (NiMH), lithium-ion (Li-ion); solar cells; fuel cells; or any other device capable of providing energy.

The transmission 122 may receive energy, such as kinetic energy, from the power source 121, and may transmit the energy to the wheels 140 to provide a motive force. The transmission 122 may be controlled by the controller 130 the actuator 124 or both. The steering unit 123 may be controlled by the controller 130 the actuator 124 or both and may control the wheels 140 to steer the vehicle. The actuator 124 may receive signals from the controller 130 and may actuate or control the power source 121, the transmission 122, the steering unit 123, or any combination thereof to operate the vehicle 100.

As shown, the controller 130 may include a location unit 131, an electronic communication unit 132, a processor 133, a memory 134, a user interface 135, a sensor 136, an electronic communication interface 137, or any combination thereof. Although shown as a single unit, any one or more elements of the controller 130 may be integrated into any number of separate physical units. For example, the user interface 135 and the processor 133 may be integrated in a first physical unit and the memory 134 may be integrated in a second physical unit. Although not shown in FIG. 1, the controller 130 may include a power source, such as a battery. Although shown as separate elements, the location unit 131, the electronic communication unit 132, the processor 133, the memory 134, the user interface 135, the sensor 136, the electronic communication interface 137, or any combination thereof may be integrated in one or more electronic units, circuits, or chips.

The processor 133 may include any device or combination of devices capable of manipulating or processing a signal or other information now-existing or hereafter developed, including optical processors, quantum processors, molecular processors, or a combination thereof. For example, the processor 133 may include one or more special purpose processors, one or more digital signal processors, one or more microprocessors, one or more controllers, one or more microcontrollers, one or more integrated circuits, one or more Application Specific Integrated Circuits, one or more Field Programmable Gate Array, one or more programmable logic arrays, one or more programmable logic controllers, one or more state machines, or any combination thereof. The processor 133 may be operatively coupled with the location unit 131, the memory 134, the electronic communication interface 137, the electronic communication unit 132, the user interface 135, the sensor 136, the powertrain 120, or any combination thereof. For example, the processor may be operatively coupled with the memory 134 via a communication bus 138.

The memory 134 may include any tangible non-transitory computer-usable or computer-readable medium, capable of, for example, containing, storing, communicating, or transporting machine readable instructions, or any information associated therewith, for use by or in connection with the processor 133. The memory 134 may be, for example, one or more solid state drives, one or more memory cards, one or more removable media, one or more read-only memories, one or more random access memories, one or more disks, including a hard disk, a floppy disk, an optical disk, a magnetic or optical card, or any type of non-transitory media suitable for storing electronic information, or any combination thereof.

The communication interface 137 may be a wireless antenna, as shown, a wired communication port, an optical communication port, or any other wired or wireless unit capable of interfacing with a wired or wireless electronic communication medium 150. Although FIG. 1 shows the communication interface 137 communicating via a single communication link, a communication interface may be configured to communicate via multiple communication links. Although FIG. 1 shows a single communication interface 137, a vehicle may include any number of communication interfaces.

The communication unit 132 may be configured to transmit or receive signals via a wired or wireless electronic communication medium 150, such as via the communication interface 137. Although not explicitly shown in FIG. 1, the communication unit 132 may be configured to transmit, receive, or both via any wired or wireless communication medium, such as radio frequency (RF), ultraviolet (UV), visible light, fiber optic, wireline, or a combination thereof. Although FIG. 1 shows a single communication unit 132 and a single communication interface 137, any number of communication units and any number of communication interfaces may be used. In some embodiments, the communication unit 132 may include a dedicated short-range communications (DSRC) unit, an on-board unit (OBU), or a combination thereof.

The location unit 131 may determine geolocation information, such as longitude, latitude, elevation, direction of travel, or speed, of the vehicle 100. For example, the location unit may include a global positioning system (GPS) unit, such as a Wide Area Augmentation System (WAAS) enabled National Marine-Electronics Association (NMEA) unit, a radio triangulation unit, or a combination thereof. The location unit 131 can be used to obtain information that represents, for example, a current heading of the vehicle 100, a current position of the vehicle 100 in two or three dimensions, a current angular orientation of the vehicle 100, or a combination thereof.

The user interface 135 may include any unit capable of interfacing with a person, such as a virtual or physical keypad, a touchpad, a display, a touch display, a heads-up display, a virtual display, an augmented reality display, a haptic display, a feature tracking device, such as an eye-tracking device, a speaker, a microphone, a video camera, a sensor, a printer, or any combination thereof. The user interface 135 may be operatively coupled with the processor 133, as shown, or with any other element of the controller 130. Although shown as a single unit, the user interface 135 may include one or more physical units. For example, the user interface 135 may include an audio interface for performing audio communication with a person and a touch display for performing visual and touch-based communication with the person. The user interface 135 may include multiple displays, such as multiple physically separate units, multiple defined portions within a single physical unit, or a combination thereof.

The sensor 136 may include one or more sensors, such as an array of sensors, which may be operable to provide information that may be used to control the vehicle. The sensors 136 may provide information regarding current operating characteristics of the vehicle 100. The sensor 136 can include, for example, a speed sensor, acceleration sensors, a steering angle sensor, traction-related sensors, braking-related sensors, steering wheel position sensors, eye tracking sensors, seating position sensors, or any sensor, or combination of sensors, operable to report information regarding some aspect of the current dynamic situation of the vehicle 100.

The sensor 136 may include one or more sensors operable to obtain information regarding the physical environment surrounding the vehicle 100. For example, one or more sensors may detect road geometry and features, such as lane lines, and obstacles, such as fixed obstacles, vehicles, and pedestrians. The sensor 136 can be or include one or more video cameras, laser-sensing systems, infrared-sensing systems, acoustic-sensing systems, or any other suitable type of on-vehicle environmental sensing device, or combination of devices, now known or later developed. In some embodiments, the sensors 136 and the location unit 131 may be a combined unit.

Although not shown separately, the vehicle 100 may include a trajectory controller. For example, the controller 130 may include the trajectory controller. The trajectory controller may be operable to obtain information describing a current state of the vehicle 100 and a route planned for the vehicle 100, and, based on this information, to determine and optimize a trajectory for the vehicle 100. In some embodiments, the trajectory controller may output signals operable to control the vehicle 100 such that the vehicle 100 follows the trajectory that is determined by the trajectory controller. For example, the output of the trajectory controller can be an optimized trajectory that may be supplied to the powertrain 120, the wheels 140, or both. In some embodiments, the optimized trajectory can be control inputs such as a set of steering angles, with each steering angle corresponding to a point in time or a position. In some embodiments, the optimized trajectory can be one or more paths, lines, curves, or a combination thereof.

One or more of the wheels 140 may be a steered wheel, which may be pivoted to a steering angle under control of the steering unit 123, a propelled wheel, which may be torqued to propel the vehicle 100 under control of the transmission 122, or a steered and propelled wheel that may steer and propel the vehicle 100.

A vehicle may include units, or elements, not expressly shown in FIG. 1, such as an enclosure, a Bluetooth® module, a frequency modulated (FM) radio unit, a Near Field Communication (NFC) module, a liquid crystal display (LCD) display unit, an organic light-emitting diode (OLED) display unit, a speaker, or any combination thereof.

The vehicle 100 may be an autonomous vehicle controlled autonomously, without direct human intervention, to traverse a portion of a vehicle transportation network. Although not shown separately in FIG. 1, an autonomous vehicle may include an autonomous vehicle control unit, which may perform autonomous vehicle routing, navigation, and control. The autonomous vehicle control unit may be integrated with another unit of the vehicle. For example, the controller 130 may include the autonomous vehicle control unit. The teachings herein are equally applicable to a semi-autonomous vehicle.

The autonomous vehicle control unit may control or operate the vehicle 100 to traverse a portion of the vehicle transportation network in accordance with current vehicle operation parameters. The autonomous vehicle control unit may control or operate the vehicle 100 to perform a defined operation or maneuver, such as parking the vehicle. The autonomous vehicle control unit may generate a route of travel from an origin, such as a current location of the vehicle 100, to a destination based on vehicle information, environment information, vehicle transportation network data representing the vehicle transportation network, or a combination thereof, and may control or operate the vehicle 100 to traverse the vehicle transportation network in accordance with the route. For example, the autonomous vehicle control unit may output the route of travel to the trajectory controller, and the trajectory controller may operate the vehicle 100 to travel from the origin to the destination using the generated route.

Figure 2:
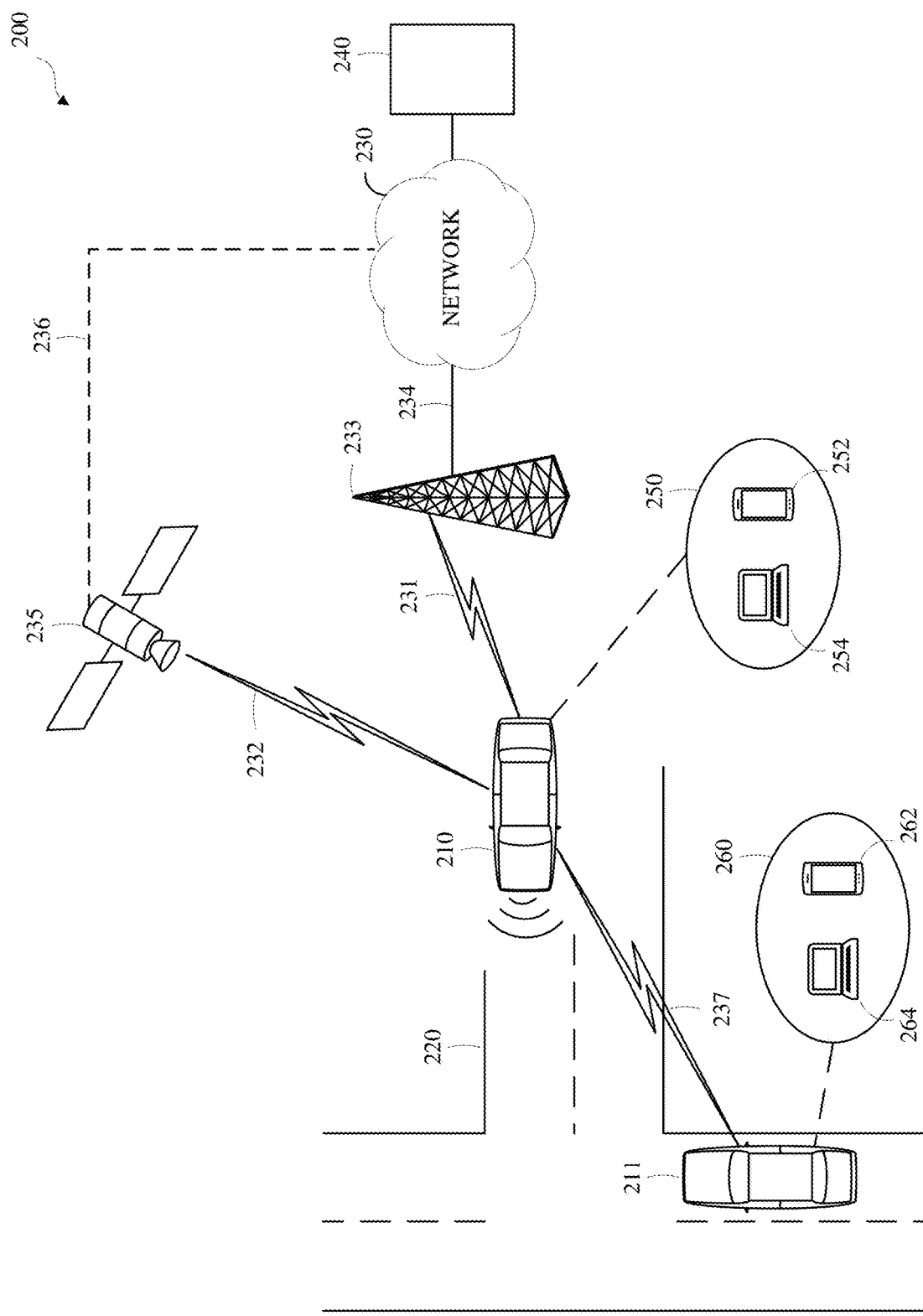
FIG. 2 is a diagram of an example of a portion of a vehicle transportation and communication system in which the aspects, features, and elements disclosed herein may be implemented.

FIG. 2 is a diagram of an example of a portion of a vehicle transportation and communication system in which the aspects, features, and elements disclosed herein may be implemented. The vehicle transportation and communication system 200 may include one or more vehicles 210/211, such as the vehicle 100 shown in FIG. 1, which may travel via one or more portions of one or more vehicle transportation networks 220, and may communicate via one or more electronic communication networks 230. Although not explicitly shown in FIG. 2, a vehicle may traverse an area that is not expressly or completely included in a vehicle transportation network, such as an off-road area.

The electronic communication network 230 may be, for example, a multiple access system and may provide for communication, such as voice communication, data communication, video communication, messaging communication, or a combination thereof, between the vehicle 210/211 and one or more communication devices 240. For example, a vehicle 210/211 may receive information, such as information representing the vehicle transportation network 220, from a communication device 240 via the network 230.

In some embodiments, a vehicle 210/211 may communicate via a wired communication link (not shown), a wireless communication link 231/232/237, or a combination of any number of wired or wireless communication links. For example, as shown, a vehicle 210/211 may communicate via a terrestrial wireless communication link 231, via a non-terrestrial wireless communication link 232, or via a combination thereof. The terrestrial wireless communication link 231 may include an Ethernet link, a serial link, a Bluetooth link, an infrared (IR) link, a UV link, or any link capable of providing for electronic communication.

A vehicle 210/211 may communicate with another vehicle 210/2110. For example, a host, or subject, vehicle (HV) 210 may receive one or more automated inter-vehicle messages, such as a basic safety message (BSM), from a remote, or target, vehicle (RV) 211, via a direct communication link 237, or via a network 230. For example, the remote vehicle 211 may broadcast the message to host vehicles within a defined broadcast range, such as 300 meters. In some embodiments, the host vehicle 210 may receive a message via a third party, such as a signal repeater (not shown) or another remote vehicle (not shown). A vehicle 210/211 may transmit one or more automated inter-vehicle messages periodically, based on, for example, a defined interval, such as 100 milliseconds.

Automated inter-vehicle messages may include vehicle identification information, geospatial state information, such as longitude, latitude, or elevation information, geospatial location accuracy information, kinematic state information, such as vehicle acceleration information, yaw rate information, speed information, vehicle heading information, braking system status information, throttle information, steering wheel angle information, or vehicle routing information, or vehicle operating state information, such as vehicle size information, headlight state information, turn signal information, wiper status information, transmission information, or any other information, or combination of information, relevant to the transmitting vehicle state. For example, transmission state information may indicate whether the transmission of the transmitting vehicle is in a neutral state, a parked state, a forward state, or a reverse state.

The vehicle 210 may communicate with the communications network 230 via an access point 233. The access point 233, which may include a computing device, may be configured to communicate with a vehicle 210, with a communication network 230, with one or more communication devices 240, or with a combination thereof via wired or wireless communication links 231/234. For example, the access point 233 may be a base station, a base transceiver station (BTS), a Node-B, an enhanced Node-B (eNode-B), a Home Node-B (HNode-B), a wireless router, a wired router, a hub, a relay, a switch, or any similar wired or wireless device. Although shown as a single unit in FIG. 2, an access point may include any number of interconnected elements.

The vehicle 210 may communicate with the communications network 230 via a satellite 235 or other non-terrestrial communication device. The satellite 235, which may include a computing device, may be configured to communicate with a vehicle 210, with a communication network 230, with one or more communication devices 240, or with a combination thereof via one or more communication links 232/236. Although shown as a single unit in FIG. 2, a satellite may include any number of interconnected elements.

An electronic communication network 230 may be any type of network configured to provide for voice, data, or any other type of electronic communication. For example, the electronic communication network 230 may include a local area network (LAN), a wide area network (WAN), a virtual private network (VPN), a mobile or cellular telephone network, the Internet, or any other electronic communication system. The electronic communication network 230 may use a communication protocol, such as the transmission control protocol (TCP), the user datagram protocol (UDP), the internet protocol (IP), the real-time transport protocol (RTP) the HyperText Transport Protocol (HTTP), or a combination thereof. Although shown as a single unit in FIG. 2, an electronic communication network may include any number of interconnected elements.

The vehicle 210 may identify a portion or condition of the vehicle transportation network 220. For example, the vehicle 210 may include one or more on-vehicle sensors, such as sensor 136 shown in FIG. 1, which may include a speed sensor, a wheel speed sensor, a camera, a gyroscope, an optical sensor, a laser sensor, a radar sensor, a sonic sensor, or any other sensor or device or combination thereof capable of determining or identifying a portion or condition of the vehicle transportation network 220. The sensor data may include lane line data, remote vehicle location data, or both.

The vehicle 210 may traverse a portion or portions of one or more vehicle transportation networks 220 using information communicated via the network 230, such as information representing the vehicle transportation network 220, information identified by one or more on-vehicle sensors, or a combination thereof.

Although for simplicity FIG. 2 shows two vehicles 210, 211, one vehicle transportation network 220, one electronic communication network 230, and one communication device 240, any number of vehicles, networks, or computing devices may be used. The vehicle transportation and communication system 200 may include devices, units, or elements not shown in FIG. 2. Although the vehicle 210 is shown as a single unit, a vehicle may include any number of interconnected elements.

Although the vehicle 210 is shown communicating with the communication device 240 via the network 230, the vehicle 210 may communicate with the communication device 240 via any number of direct or indirect communication links. For example, the vehicle 210 may communicate with the communication device 240 via a direct communication link, such as a Bluetooth communication link.

In some embodiments, a vehicle 210/211 may be associated with an entity 250/260, such as a driver, operator, or owner of the vehicle. In some embodiments, an entity 250/260 associated with a vehicle 210/211 may be associated with one or more personal electronic devices 252/254/262/264, such as a smartphone 252/262 or a computer 254/264. In some embodiments, a personal electronic device 252/254/262/264 may communicate with a corresponding vehicle 210/211 via a direct or indirect communication link. Although one entity 250/260 is shown as associated with a respective vehicle 210/211 in FIG. 2, any number of vehicles may be associated with an entity and any number of entities may be associated with a vehicle.

The vehicle transportation network 220 shows only navigable areas (e.g., roads), but the vehicle transportation network may also include one or more unnavigable areas, such as a building, one or more partially navigable areas, such as a parking area or pedestrian walkway, or a combination thereof. The vehicle transportation network 220 may also include one or more interchanges between one or more navigable, or partially navigable, areas. A portion of the vehicle transportation network 220, such as a road, may include one or more lanes and may be associated with one or more directions of travel.

A vehicle transportation network, or a portion thereof, may be represented as vehicle transportation network data. For example, vehicle transportation network data may be expressed as a hierarchy of elements, such as markup language elements, which may be stored in a database or file. For simplicity, the figures herein depict vehicle transportation network data representing portions of a vehicle transportation network as diagrams or maps; however, vehicle transportation network data may be expressed in any computer-usable form capable of representing a vehicle transportation network, or a portion thereof. The vehicle transportation network data may include vehicle transportation network control information, such as direction of travel information, speed limit information, toll information, grade information, such as inclination or angle information, surface material information, aesthetic information, defined hazard information, or a combination thereof.

A portion, or a combination of portions, of the vehicle transportation network 220 may be identified as a point of interest or a destination. For example, the vehicle transportation network data may identify a building as a point of interest or destination. The point of interest or destination may be identified using a discrete uniquely identifiable geolocation. For example, the vehicle transportation network 220 may include a defined location, such as a street address, a postal address, a vehicle transportation network address, a GPS address, or a combination thereof for the destination.

Figure 3:
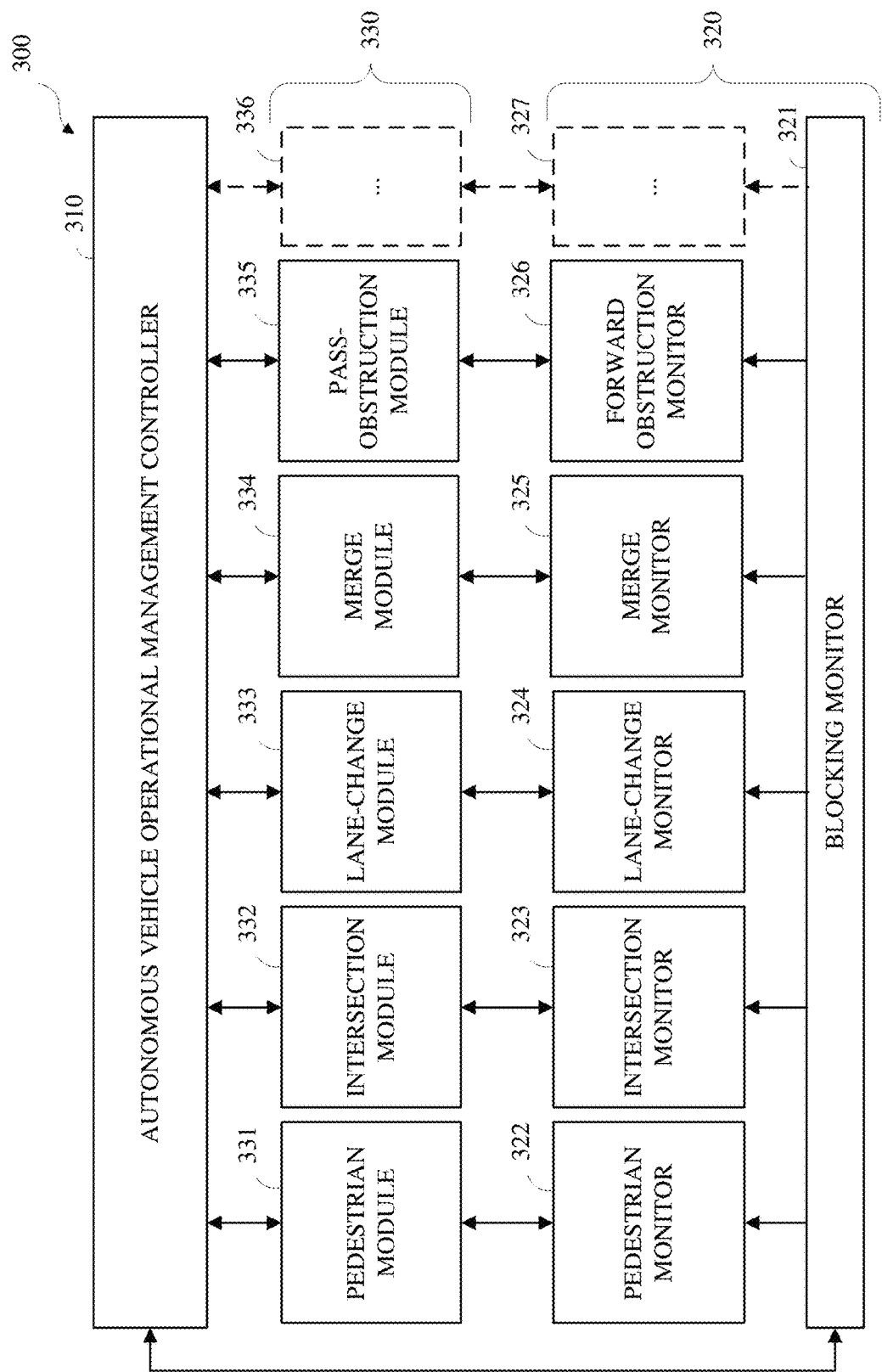
FIG. 3 is a diagram of an example of an autonomous vehicle operational management system in accordance with embodiments of this disclosure.

FIG. 3 is a diagram of an example of an autonomous vehicle operational management system 300 in accordance with embodiments of this disclosure. The autonomous vehicle operational management system 300 may be implemented in an autonomous vehicle, such as the vehicle 100 shown in FIG. 1, one of the vehicles 210/211 shown in FIG. 2, a semi-autonomous vehicle, or any other vehicle implementing autonomous driving.

The autonomous vehicle may traverse a vehicle transportation network, or a portion thereof, which may include traversing distinct vehicle operational scenarios. A distinct vehicle operational scenario may include any distinctly identifiable set of operative conditions that may affect the operation of the autonomous vehicle within a defined spatiotemporal area, or operational environment, of the autonomous vehicle. For example, a distinct vehicle operational scenario may be based on a number or cardinality of roads, road segments, or lanes that the autonomous vehicle may traverse within a defined spatiotemporal distance. In another example, a distinct vehicle operational scenario may be based on one or more traffic control devices that may affect the operation of the autonomous vehicle within a defined spatiotemporal area, or operational environment, of the autonomous vehicle. In another example, a distinct vehicle operational scenario may be based on one or more identifiable rules, regulations, or laws that may affect the operation of the autonomous vehicle within a defined spatiotemporal area, or operational environment, of the autonomous vehicle. In another example, a distinct vehicle operational scenario may be based on one or more identifiable external objects that may affect the operation of the autonomous vehicle within a defined spatiotemporal area, or operational environment, of the autonomous vehicle.

For simplicity and clarity, similar vehicle operational scenarios may be described herein with reference to vehicle operational scenario types or classes. A type or class of a vehicle operation scenario may refer to a defined pattern or a defined set of patterns of the scenario. For example, intersection scenarios may include the autonomous vehicle traversing an intersection, pedestrian scenarios may include the autonomous vehicle traversing a portion of the vehicle transportation network that includes, or is within a defined proximity of, one or more pedestrians, such as wherein a pedestrian is crossing, or approaching, the expected path of the autonomous vehicle; lane-change scenarios may include the autonomous vehicle traversing a portion of the vehicle transportation network by changing lanes; merge scenarios may include the autonomous vehicle traversing a portion of the vehicle transportation network by merging from a first lane to a merged lane; pass-obstruction scenarios may include the autonomous vehicle traversing a portion of the vehicle transportation network by passing an obstacle or obstruction. Although pedestrian vehicle operational scenarios, intersection vehicle operational scenarios, lane-change vehicle operational scenarios, merge vehicle operational scenarios, and pass-obstruction vehicle operational scenarios are described herein, any other vehicle operational scenario or vehicle operational scenario type may be used.

As shown in FIG. 3, the autonomous vehicle operational management system 300 includes an autonomous vehicle operational management controller (AVOMC) 310, operational environment monitors 320, and operation control evaluation modules (also referred to as models) 330.

The AVOMC 310 may receive, identify, or otherwise access, operational environment data representing an operational environment for the autonomous vehicle, such as a current operational environment or an expected operational environment, or one or more aspects thereof. The operational environment of the autonomous vehicle may include a distinctly identifiable set of operative conditions that may affect the operation of the autonomous vehicle within a defined spatiotemporal area of the autonomous vehicle, within a defined spatiotemporal area of an identified route for the autonomous vehicle, or a combination thereof. For example, operative conditions that may affect the operation of the autonomous vehicle may be identified based on sensor data, vehicle transportation network data, route data, or any other data or combination of data representing a defined or determined operational environment for the vehicle.

The operational environment data may include vehicle information for the autonomous vehicle, such as information indicating a geospatial location of the autonomous vehicle, information correlating the geospatial location of the autonomous vehicle to information representing the vehicle transportation network, a route of the autonomous vehicle, a speed of the autonomous vehicle, an acceleration state of the autonomous vehicle, passenger information of the autonomous vehicle, or any other information about the autonomous vehicle or the operation of the autonomous vehicle. The operational environment data may include information representing the vehicle transportation network proximate to the autonomous vehicle, an identified route for the autonomous vehicle, or both. For example, this may include information within a defined spatial distance, such as 300 meters, of portions of the vehicle transportation network along the identified route, information indicating the geometry of one or more aspects of the vehicle transportation network, information indicating a condition, such as a surface condition, of the vehicle transportation network, or any combination thereof.

The operational environment data may include information representing external objects within the operational environment of the autonomous vehicle, such as information representing pedestrians, non-human animals, non-motorized transportation devices, such as bicycles or skateboards, motorized transportation devices, such as remote vehicles, or any other external object or entity that may affect the operation of the autonomous vehicle.

Aspects of the operational environment of the autonomous vehicle may be represented within respective distinct vehicle operational scenarios. For example, the relative orientation, trajectory, expected path, of external objects may be represented within respective distinct vehicle operational scenarios. In another example, the relative geometry of the vehicle transportation network may be represented within respective distinct vehicle operational scenarios.

As an example, a first distinct vehicle operational scenario may correspond to a pedestrian crossing a road at a crosswalk, and a relative orientation and expected path of the pedestrian, such as crossing from left to right for crossing from right to left, may be represented within the first distinct vehicle operational scenario. A second distinct vehicle operational scenario may correspond to a pedestrian crossing a road by jaywalking, and a relative orientation and expected path of the pedestrian, such as crossing from left to right for crossing from right to left, may be represented within the second distinct vehicle operational scenario.

The autonomous vehicle may traverse multiple distinct vehicle operational scenarios within an operational environment, which may be aspects of a compound vehicle operational scenario. For example, a pedestrian may approach the expected path for the autonomous vehicle traversing an intersection.

The autonomous vehicle operational management system 300 may operate or control the autonomous vehicle to traverse the distinct vehicle operational scenarios subject to defined constraints, such as safety constraints, legal constraints, physical constraints, user acceptability constraints, or any other constraint or combination of constraints that may be defined or derived for the operation of the autonomous vehicle.

The AVOMC 310 may monitor the operational environment of the autonomous vehicle, or defined aspects thereof. Monitoring the operational environment of the autonomous vehicle may include identifying and tracking external objects, identifying distinct vehicle operational scenarios, or a combination thereof. For example, the AVOMC 310 may identify and track external objects with the operational environment of the autonomous vehicle. Identifying and tracking the external objects may include identifying spatiotemporal locations of respective external objects, which may be relative to the autonomous vehicle, identifying one or more expected paths for respective external objects, which may include identifying a speed, a trajectory, or both, for an external object. For simplicity and clarity, descriptions of locations, expected locations, paths, expected paths, and the like herein may omit express indications that the corresponding locations and paths refer to geospatial and temporal components; however, unless expressly indicated herein, or otherwise unambiguously clear from context, the locations, expected locations, paths, expected paths, and the like described herein may include geospatial components, temporal components, or both. Monitoring the operational environment of the autonomous vehicle may include using operational environment data received from the operational environment monitors 320.

The operational environment monitors 320 may include scenario-agnostic monitors, scenario-specific monitors, or a combination thereof. A scenario-agnostic monitor, such as a blocking monitor 321, may monitor the operational environment of the autonomous vehicle, generate operational environment data representing aspects of the operational environment of the autonomous vehicle, and output the operational environment data to one or more scenario-specific monitor, the AVOMC 310, or a combination thereof, as discussed in further detail below. A scenario-specific monitor, such as a pedestrian monitor 322, an intersection monitor 323, a lane-change monitor 324, a merge monitor 325, or a forward obstruction monitor 326, may monitor the operational environment of the autonomous vehicle, generate operational environment data representing scenario-specific aspects of the operational environment of the autonomous vehicle, and output the operational environment data to one or more operation control evaluation models 330, the AVOMC 310, or a combination thereof.

For example, the pedestrian monitor 322 may be an operational environment monitor for monitoring pedestrians, the intersection monitor 323 may be an operational environment monitor for monitoring intersections, the lane-change monitor 324 may be an operational environment monitor for monitoring lane-changes, the merge monitor 325 may be an operational environment monitor for merges, and the forward obstruction monitor 326 may be an operational environment monitor for monitoring forward obstructions. An operational environment monitor 327 is shown using broken lines to indicate that the autonomous vehicle operational management system 300 may include any number of operational environment monitors 320.

An operational environment monitor 320 may receive, or otherwise access, operational environment data, such as operational environment data generated or captured by one or more sensors of the autonomous vehicle, vehicle transportation network data, vehicle transportation network geometry data, route data, or a combination thereof. For example, the pedestrian monitor 322 may receive, or otherwise access, information, such as sensor data, which may indicate, correspond to, or may otherwise be associated with, one or more pedestrians in the operational environment of the autonomous vehicle. An operational environment monitor 320 may associate the operational environment data, or a portion thereof, with the operational environment, or an aspect thereof, such as with an external object, such as a pedestrian, a remote vehicle, or an aspect of the vehicle transportation network geometry.

An operational environment monitor 320 may generate, or otherwise identify, information representing one or more aspects of the operational environment, such as with an external object, such as a pedestrian, a remote vehicle, or an aspect of the vehicle transportation network geometry, which may include filtering, abstracting, or otherwise processing the operational environment data. An operational environment monitor 320 may output the information representing the one or more aspects of the operational environment to, or for access by, the AVOMC 310, such by storing the information representing the one or more aspects of the operational environment in a memory, such as the memory 134 shown in FIG. 1, of the autonomous vehicle accessible by the AVOMC 310, sending the information representing the one or more aspects of the operational environment to the AVOMC 310, or a combination thereof. An operational environment monitor 320 may output the operational environment data to one or more elements of the autonomous vehicle operational management system 300, such as the AVOMC 310. Although not shown in FIG. 3, a scenario-specific operational environment monitor 322, 323, 324, 325, 326 may output operational environment data to a scenario-agnostic operational environment monitor, such as the blocking monitor 321.

The pedestrian monitor 322 may correlate, associate, or otherwise process the operational environment data to identify, track, or predict actions of one or more pedestrians. For example, the pedestrian monitor 322 may receive information, such as sensor data, from one or more sensors, which may correspond to one or more pedestrians, the pedestrian monitor 322 may associate the sensor data with one or more identified pedestrians, which may include may identifying a direction of travel, a path, such as an expected path, a current or expected velocity, a current or expected acceleration rate, or a combination thereof for one or more of the respective identified pedestrians, and the pedestrian monitor 322 may output the identified, associated, or generated pedestrian information to, or for access by, the AVOMC 310.

The intersection monitor 323 may correlate, associate, or otherwise process the operational environment data to identify, track, or predict actions of one or more remote vehicles in the operational environment of the autonomous vehicle, to identify an intersection, or an aspect thereof, in the operational environment of the autonomous vehicle, to identify vehicle transportation network geometry, or a combination thereof. For example, the intersection monitor 323 may receive information, such as sensor data, from one or more sensors, which may correspond to one or more remote vehicles in the operational environment of the autonomous vehicle, the intersection, or one or more aspects thereof, in the operational environment of the autonomous vehicle, the vehicle transportation network geometry, or a combination thereof, the intersection monitor 323 may associate the sensor data with one or more identified remote vehicles in the operational environment of the autonomous vehicle, the intersection, or one or more aspects thereof, in the operational environment of the autonomous vehicle, the vehicle transportation network geometry, or a combination thereof, which may include may identifying a current or expected direction of travel, a path, such as an expected path, a current or expected velocity, a current or expected acceleration rate, or a combination thereof for one or more of the respective identified remote vehicles. The intersection monitor 323 may output the identified, associated, or generated intersection information to, or for access by, the AVOMC 310.

The lane-change monitor 324 may correlate, associate, or otherwise process the operational environment data to identify, track, or predict actions of one or more remote vehicles in the operational environment of the autonomous vehicle, such as information indicating a slow or stationary remote vehicle along the expected path of the autonomous vehicle, to identify one or more aspects of the operational environment of the autonomous vehicle, such as vehicle transportation network geometry in the operational environment of the autonomous vehicle, or a combination thereof geospatially corresponding to a lane-change operation. For example, the lane-change monitor 324 may receive information, such as sensor data, from one or more sensors, which may correspond to one or more remote vehicles in the operational environment of the autonomous vehicle, one or more aspects of the operational environment of the autonomous vehicle in the operational environment of the autonomous vehicle or a combination thereof geospatially corresponding to a lane-change operation, the lane-change monitor 324 may associate the sensor data with one or more identified remote vehicles in the operational environment of the autonomous vehicle, one or more aspects of the operational environment of the autonomous vehicle or a combination thereof geospatially corresponding to a lane-change operation, which may include may identifying a current or expected direction of travel, a path, such as an expected path, a current or expected velocity, a current or expected acceleration rate, or a combination thereof for one or more of the respective identified remote vehicles. The lane-change monitor 324 may output the identified, associated, or generated lane-change information to, or for access by, the AVOMC 310

The merge monitor 325 may correlate, associate, or otherwise process the operational environment information to identify, track, or predict actions of one or more remote vehicles in the operational environment of the autonomous vehicle, to identify one or more aspects of the operational environment of the autonomous vehicle, such as vehicle transportation network geometry in the operational environment of the autonomous vehicle, or a combination thereof geospatially corresponding to a merge operation. For example, the merge monitor 325 may receive information, such as sensor data, from one or more sensors, which may correspond to one or more remote vehicles in the operational environment of the autonomous vehicle, one or more aspects of the operational environment of the autonomous vehicle in the operational environment of the autonomous vehicle or a combination thereof geospatially corresponding to a merge operation, the merge monitor 325 may associate the sensor data with one or more identified remote vehicles in the operational environment of the autonomous vehicle, one or more aspects of the operational environment of the autonomous vehicle or a combination thereof geospatially corresponding to a merge operation, which may include identifying a current or expected direction of travel, a path, such as an expected path, a current or expected velocity, a current or expected acceleration rate, or a combination thereof for one or more of the respective identified remote vehicles. The merge monitor 325 may output the identified, associated, or generated merge information to, or for access by, the AVOMC 310.

The forward obstruction monitor 326 may correlate, associate, or otherwise process the operational environment information to identify one or more aspects of the operational environment of the autonomous vehicle geospatially corresponding to a forward pass-obstruction operation. For example, the forward obstruction monitor 326 may identify vehicle transportation network geometry in the operational environment of the autonomous vehicle. The forward obstruction monitor 326 may identify one or more obstructions or obstacles in the operational environment of the autonomous vehicle, such as a slow or stationary remote vehicle along the expected path of the autonomous vehicle or along an identified route for the autonomous vehicle; and the forward obstruction monitor 326 may identify, track, or predict actions of one or more vehicles in the operational environment of the autonomous vehicle. The forward obstruction monitor 326 may receive information, such as sensor data, from one or more sensors, which may correspond to one or more remote vehicles in the operational environment of the autonomous vehicle, one or more aspects of the operational environment of the autonomous vehicle in the operational environment of the autonomous vehicle or a combination thereof geospatially corresponding to a forward pass-obstruction operation. The forward obstruction monitor 326 may associate the sensor data with one or more identified remote vehicles in the operational environment of the autonomous vehicle, one or more aspects of the operational environment of the autonomous vehicle or a combination thereof geospatially corresponding to the forward pass-obstruction operation, which may include may identifying a current or expected direction of travel, a path, such as an expected path, a current or expected velocity, a current or expected acceleration rate, or a combination thereof for one or more of the respective identified remote vehicles. The forward obstruction monitor 326 may output the identified, associated, or generated forward obstruction information to, or for access by, the AVOMC 310.

While shown as an operation environment monitor 320, the blocking monitor 321 may be a separate monitoring device. The blocking monitor 321 may receive operational environment data representing an operational environment, or an aspect thereof, for the autonomous vehicle. For example, the blocking monitor 321 may receive the operational environment information from the AVOMC 310, from a sensor of the vehicle, from an external device, such as a remote vehicle or an infrastructure device, or a combination thereof. The blocking monitor 321 may read the operational environment information, or a portion thereof, from a memory, such as a memory of the autonomous vehicle, such as the memory 134 shown in FIG. 1.

The blocking monitor 321, using this input, may determine a respective probability of availability (POA), or corresponding blocking probability, for one or more portions of the vehicle transportation network, such as portions of the vehicle transportation network proximal to the autonomous vehicle, which may include portions of the vehicle transportation network corresponding to an expected path of the autonomous vehicle, such as an expected path identified based on a current route of the autonomous vehicle. A probability of availability, or corresponding blocking probability, may indicate a probability or likelihood that the autonomous vehicle may traverse a portion of, or spatial location within, the vehicle transportation network safely, such as unimpeded by an external object, such as a remote vehicle or a pedestrian. For example, a portion of the vehicle transportation network may include an obstruction, such as a stationary object, and a probability of availability for the portion of the vehicle transportation network may be low, such as 0%, which may be expressed as a high blocking probability, such as 100%, for the portion of the vehicle transportation network. The blocking monitor 321 may identify a respective probability of availability for each of multiple portions of the vehicle transportation network within an operational environment, such as within 300 meters, of the autonomous vehicle. The blocking monitor 321 may determine, or update, probabilities of availability continually or periodically. The blocking monitor 321 may communicate probabilities of availability, or corresponding blocking probabilities, to the AVOMC 310.

A probability of availability may be indicated by the blocking monitor 321 corresponding to each external object in the operational environment of the autonomous vehicle and a geospatial area may be associated with multiple probabilities of availability corresponding to multiple external objects. An aggregate probability of availability may be indicated by the blocking monitor 321 corresponding to each type of external object in the operational environment of the autonomous vehicle, such as a probability of availability for pedestrians and a probability of availability for remote vehicles, and a geospatial area may be associated with multiple probabilities of availability corresponding to multiple external object types.

The blocking monitor 321 may identify external objects, track external objects, project location information, path information, or both for external objects, or a combination thereof. For example, the blocking monitor 321 may identify an external object and identify an expected path for the external object based on operational environment information (e.g., a current location of the external object), information indicating a current trajectory and/or speed for the external object, information indicating a type of classification of the external object (e.g., a pedestrian or a remote vehicle), vehicle transportation network information (e.g., a crosswalk proximate to the external object), previously identified or tracked information associated with the external object, or any combination thereof. The expected path may indicate a sequence of expected spatial locations, expected temporal locations, and corresponding probabilities.

The blocking monitor 321 may communicate probabilities of availability, or corresponding blocking probabilities, to the AVOMC 310. The AVOMC 310 may communicate the probabilities of availability, or corresponding blocking probabilities, to respective instantiated instances of the operational control evaluation modules 330.

The AVOMC 310 may identify one or more distinct vehicle operational scenarios based on one or more aspects of the operational environment represented by the operational environment data. For example, the AVOMC 310 may identify a distinct vehicle operational scenario in response to identifying, or based on, the operational environment data indicated by one or more of the operational environment monitors 320. The distinct vehicle operational scenario may be identified based on route data, sensor data, or a combination thereof. For example, the AVOMC 310 may identify one or multiple distinct vehicle operational scenarios corresponding to an identified route for the vehicle, such as based on map data corresponding to the identified route, in response to identifying the route. Multiple distinct vehicle operational scenarios may be identified based on one or more aspects of the operational environment represented by the operational environment data. For example, the operational environment data may include information representing a pedestrian approaching an intersection along an expected path for the autonomous vehicle, and the AVOMC 310 may identify a pedestrian vehicle operational scenario, an intersection vehicle operational scenario, or both.

The AVOMC 310 may instantiate respective instances of one or more of the operation control evaluation models 330 based on one or more aspects of the operational environment represented by the operational environment data, such as the identification of an upcoming scenario. An upcoming scenario may be a distinct vehicle operational scenario that the AVOMC 310 determines that the autonomous vehicle is likely to encounter if it continues in its path. Upcoming scenarios may be expected (e.g., can be determined from the route of the autonomous vehicle) or unexpected. An unexpected upcoming scenario may be a scenario that can be detected by the sensors of the vehicle and cannot be determined without sensor data.

The operation control evaluation models 330 may include scenario-specific operation control evaluation model (SSO-CEMs), such as a pedestrian-SSOCEM 331, an intersection-SSOCEM 332, a lane-change-SSOCEM 333, a merge-SSOCEM 334, a pass-obstruction-SSOCEM 335, or a combination thereof. A SSOCEM 336 is shown using broken lines to indicate that the autonomous vehicle operational management system 300 may include any number of SSOCEMs 330. For example, the AVOMC 310 may instantiate an instance of a SSOCEM 330 in response to identifying a distinct vehicle operational scenario. The AVOMC 310 may instantiate multiple instances of one or more SSOCEMs 330 based on one or more aspects of the operational environment represented by the operational environment data. For example, the operational environment data may indicate two pedestrians in the operational environment of the autonomous vehicle and the AVOMC 310 may instantiate a respective instance of the pedestrian-SSOCEM 331 for each pedestrian.

The AVOMC 310 may send the operational environment data, or one or more aspects thereof, to another unit of the autonomous vehicle, such as the blocking monitor 321 or one or more instances of the SSOCEMs 330. For example, the AVOMC 310 may communicate the probabilities of availability, or corresponding blocking probabilities, received from the blocking monitor 321 to respective instantiated instances of the SSOCEMs 330. The AVOMC 310 may store the operational environment data, or one or more aspects thereof, such as in a memory, such as the memory 134 shown in FIG. 1, of the autonomous vehicle.

Although not expressly shown in FIG. 3, the autonomous vehicle operational management system 300 may include a predictor module that may generate and send prediction information to the blocking monitor 321, and the blocking monitor 321 may output probability of availability information to one or more of the other operational environment monitors 320.

A SSOCEM 330, once instantiated, can receive the operational environment information, including sensor data, to determine and output a candidate vehicle control action, also called a candidate action herein. A candidate action is a vehicle control action that is identified by the particular SSOCEM 330 as the likely optimal action for the vehicle to perform that will handle a particular scenario. For instance, a SSOCEM 330 configured to handle intersections (e.g., an intersection SSOCEM 332) may output a "proceed", a candidate action that suggests proceeding through an intersection. At the same time, a SSOCEM 330 for handling lane changes (e.g., the lane change SSOCEM 333) may output a "turn left" candidate action indicating that the vehicle should merge left by two degrees. In some implementations, each SSOCEM 330 outputs a confidence score indicating a degree of confidence in the candidate action determined by the SSOCEM 330. For instance, a confidence score greater than 0.95 may indicate a very high confidence in the candidate action, while a confidence score less than 0.5 may indicate a relatively low degree of confidence in the candidate action. Further details of a SSOCEM 330 are described below.

The AVOMC 310 may receive one or more candidate actions from respective instances of the SSOCEMs 330. The AVOMC 310 may identify a vehicle control action from the candidate vehicle control actions, and may control the vehicle, or may provide the identified vehicle control action to another vehicle control unit, to traverse the vehicle transportation network in accordance with the vehicle control action.

A vehicle control action may indicate a vehicle control operation or maneuver, such as accelerating, decelerating, turning, stopping, or any other vehicle operation or combination of vehicle operations that may be performed by the autonomous vehicle in conjunction with traversing a portion of the vehicle transportation network. For example, an 'advance' vehicle control action may include slowly inching forward a short distance, such as a few inches or a foot; an 'accelerate' vehicle control action may include accelerating a defined acceleration rate, or at an acceleration rate within a defined range; a 'decelerate' vehicle control action may include decelerating a defined deceleration rate, or at a deceleration rate within a defined range; a 'maintain' vehicle control action may include maintaining current operational parameters, such as by maintaining a current velocity, a current path or route, or a current lane orientation; and a 'proceed' vehicle control action may include beginning or resuming a previously identified set of operational parameters. Although some vehicle control actions are described herein, other vehicle control actions may be used.

A vehicle control action may include one or more performance metrics. For example, a 'stop' vehicle control action may include a deceleration rate as a performance metric. In another example, a 'proceed' vehicle control action may expressly indicate route or path information, speed information, an acceleration rate, or a combination thereof as performance metrics, or may expressly or implicitly indicate that a current or previously identified path, speed, acceleration rate, or a combination thereof may be maintained.

A vehicle control action may be a compound vehicle control action, which may include a sequence, combination, or both of vehicle control actions. For example, an 'advance' vehicle control action may indicate a 'stop' vehicle control action, a subsequent 'accelerate' vehicle control action associated with a defined acceleration rate, and a subsequent 'stop' vehicle control action associated with a defined deceleration rate, such that controlling the autonomous vehicle in accordance with the 'advance' vehicle control action includes controlling the autonomous vehicle to slowly inch forward a short distance, such as a few inches or a foot.

In some implementations, the AVOMC 310 utilizes hardcoded logic to determine the vehicle control action from the candidate actions. For example, the AVOMC 310 may select the candidate action having the highest confidence score. In other implementations, the AVOMC 310 may select the candidate action that is the least likely to result in a collision. In other implementations, the AVOMC 310 may generate a compound action based on two or more non-conflicting candidate actions (e.g., compounding 'proceed' and 'turn left by two degrees' to result in a vehicle control action that causes the vehicle to veer left and proceed through an intersection). In some implementations, the AVOMC 310 may utilize a machine learning algorithm to determine a vehicle control action based on two or more differing candidate actions.

For example, identifying the vehicle control action from the candidate actions may include implementing a machine learning component, such as supervised learning of a classification problem, and training the machine learning component using examples, such as 1000 examples, of the corresponding vehicle operational scenario. In another example, identifying the vehicle control action from the candidate actions may include implementing a Markov Decision Process (MDP), or a Partially Observable Markov Decision Processes (POMDP), which may describe how respective candidate actions affect subsequent candidate actions, and may include a reward function that outputs a positive or negative reward for respective vehicle control actions.

The AVOMC 310 may uninstantiate an instance of a SSOCEM 330. For example, the AVOMC 310 may identify a distinct set of operative conditions as indicating a distinct vehicle operational scenario for the autonomous vehicle, instantiate an instance of a SSOCEM 330 for the distinct vehicle operational scenario, monitor the operative conditions, subsequently determine that one or more of the operative conditions has expired, or has a probability of affecting the operation of the autonomous vehicle below a defined threshold, and the AVOMC 310 may uninstantiate the instance of the SSOCEM 330.

As referred to briefly above, a SSOCEM 330 may model a respective distinct vehicle operational scenario. The autonomous vehicle operational management system 300 includes any number of SSOCEMs 330, each modeling a respective distinct vehicle operational scenario. Modeling a distinct vehicle operational scenario may include generating and/or maintaining state information representing aspects of an operational environment of the vehicle corresponding to the distinct vehicle operational scenario, identifying potential interactions among the modeled aspects respective of the corresponding states, and determining a candidate action that solves the model. Stated more simply, a SSOCEM 330 may include one or more models that are configured to determine one or more vehicle control actions for handling a scenario given a set of inputs. The models may include, but are not limited to, Partially Observable Markov Decision Process (POMDP) models, Markov Decision Process (MDP) models, Classical Planning (CP) models, Partially Observable Stochastic Game (POSG) models, Decentralized Partially Observable Markov Decision Process (Dec-POMDP) models, Reinforcement Learning (RL) models, artificial neural networks, hardcoded expert logic, or any other suitable types of models. Examples of different types of models are provided below. Each SSOCEM 330 includes computer-executable instructions that define a manner by which the models operate and a manner by which the models are utilized.

A SSOCEM 330 may implement a CP model, which may be a single-agent model that models a distinct vehicle operational scenario based on a defined input state. The defined input state may indicate respective non-probabilistic states of the elements of the operational environment of the autonomous vehicle for the distinct vehicle operational scenario. In a CP model, one or more aspects (e.g., geospatial location) of modeled elements (e.g., external objects) that are associated with a temporal location may differ from the corresponding aspects associated with another temporal location, such as an immediately subsequent temporal location, non-probabilistically, such as by a defined, or fixed, amount. For example, at a first temporal location, a remote vehicle may have a first geospatial location, and, at an immediately subsequent second temporal location the remote vehicle may have a second geospatial location that differs from the first geospatial location by a defined geospatial distances, such as a defined number of meters, along an expected path for the remote vehicle.

A SSOCEM 330 may implement a discrete time stochastic control process, such as a MDP model, which may be a single-agent model that model a distinct vehicle operational scenario based on a defined input state. Changes to the operational environment of the autonomous vehicle, such as a change of location for an external object, may be modeled as probabilistic changes. A MDP model may utilize more processing resources and may more accurately model the distinct vehicle operational scenario than a CP model.

A MDP model may model a distinct vehicle operational scenario using a set of states, a set of actions, a set of state transition probabilities, a reward function, or a combination thereof. In some embodiments, modeling a distinct vehicle operational scenario may include using a discount factor, which may adjust, or discount, the output of the reward function applied to subsequent temporal periods.

The set of states may include a current state of the MDP model, one or more possible subsequent states of the MDP model, or a combination thereof. A state represent an identified condition, which may be an expected condition, of respective defined aspects, such as external objects and traffic control devices, of the operational environment of the vehicle that may probabilistically affect the operation of the vehicle at a discrete temporal location. For example, a remote vehicle operating in the proximity of the vehicle may affect the operation of the vehicle and may be represented in a MDP model. The MDP model may include representing the following identified or expected information for the remote vehicle: its geospatial location, its path, heading, or both, its velocity, its acceleration or deceleration rate, or a combination thereof corresponding to a respective temporal location. At instantiation, the current state of the MDP model may correspond to a contemporaneous state or condition of the operating environment.

Although any number or cardinality of states may be used, the number or cardinality of states included in a model may be limited to a defined maximum number of states. For example, a model may include the 300 most probable states for a corresponding scenario.

The set of actions may include vehicle control actions available to the MDP model at each state in the set of states. A respective set of actions may be defined for each distinct vehicle operational scenario.

The set of state transition probabilities may probabilistically represent potential or expected changes to the operational environment of the vehicle, as represented by the states, responsive to the actions. For example, a state transition probability may indicate a probability that the operational environment corresponds to a respective state at a respective temporal location immediately subsequent to a current temporal location corresponding to a current state in response to traversing the vehicle transportation network by the vehicle from the current state in accordance with a respective action.

The set of state transition probabilities may be identified based on the operational environment information. For example, the operational environment information may indicate an area type, such as urban or rural, a time of day, an ambient light level, weather conditions, traffic conditions, which may include expected traffic conditions, such as rush hour conditions, event-related traffic congestion, or holiday related driver behavior conditions, road conditions, jurisdictional conditions, such as country, state, or municipality conditions, or any other condition or combination of conditions that may affect the operation of the vehicle.

Examples of state transition probabilities associated with a pedestrian vehicle operational scenario may include a defined probability of a pedestrian jaywalking (e.g., based on a geospatial distance between the pedestrian and the respective road segment); a defined probability of a pedestrian stopping in an intersection; a defined probability of a pedestrian crossing at a crosswalk; a defined probability of a pedestrian yielding to the autonomous vehicle at a crosswalk; any other probability associated with a pedestrian vehicle operational scenario.

Examples of state transition probabilities associated with an intersection vehicle operational scenario may include a defined probability of a remote vehicle arriving at an intersection; a defined probability of a remote vehicle cutting-off the autonomous vehicle; a defined probability of a remote vehicle traversing an intersection immediately subsequent to, and in close proximity to, a second remote vehicle traversing the intersection, such as in the absence of a right-of-way (piggybacking); a defined probability of a remote vehicle stopping, adjacent to the intersection, in accordance with a traffic control device, regulation, or other indication of right-of-way, prior to traversing the intersection; a defined probability of a remote vehicle traversing the intersection; a defined probability of a remote vehicle diverging from an expected path proximal to the intersection; a defined probability of a remote vehicle diverging from an expected right-of-way priority; any other probability associated with an intersection vehicle operational scenario.

Examples of state transition probabilities associated with a lane change vehicle operational scenario may include a defined probability of a remote vehicle changing velocity, such as a defined probability of a remote vehicle behind the vehicle increasing velocity or a defined probability of a remote vehicle in front of the vehicle decreasing velocity; a defined probability of a remote vehicle in front of the vehicle changing lanes; a defined probability of a remote vehicle proximate to the vehicle changing speed to allow the vehicle to merge into a lane; or any other probabilities associated with a lane change vehicle operational scenario.

The reward function may determine a respective positive or negative (cost) value accrued for each combination of state and action. This accrual represents an expected value of the vehicle traversing the vehicle transportation network from the corresponding state in accordance with the corresponding vehicle control action to the subsequent state.

For example, a POMDP model may include an autonomous vehicle at a first geospatial location and a first temporal location corresponding to a first state. The model may indicate that the vehicle identify and perform, or attempt to perform, a vehicle control action to traverse the vehicle transportation network from the first geospatial location to a second geospatial location at a second temporal location immediately subsequent to the first temporal location. The set of observations corresponding to the second temporal location may include the operational environment information that is identified corresponding to the second temporal location, such as geospatial location information for the vehicle, geospatial location information for one or more external objects, probabilities of availability, expected path information, or the like.

The set of conditional observation probabilities may include probabilities of making respective observations based on the operational environment of the autonomous vehicle. For example, the autonomous vehicle may approach an intersection by traversing a first road, contemporaneously, a remote vehicle may approach the intersection by traversing a second road, the autonomous vehicle may identify and evaluate operational environment information, such as sensor data, corresponding to the intersection, which may include operational environment information corresponding to the remote vehicle. The operational environment information may be inaccurate, incomplete, or erroneous. In a MDP model, the autonomous vehicle may non-probabilistically identify the remote vehicle, which may include identifying its location, an expected path, or the like, and the identified information, such as the identified location, based on inaccurate operational environment information, may be inaccurate or erroneous. In a POMDP model, the autonomous vehicle may identify information probabilistically identifying the remote vehicle, such as probabilistically identifying location information for the remote vehicle. The conditional observation probability corresponding to observing, or probabilistically identifying, the location of the remote vehicle represents the probability that the identified operational environment information accurately represents the location of the remote vehicle.

A SSOCEM 330 may implement a Dec-POMDP model, which may be a multi-agent model that models a distinct vehicle operational scenario. A Dec-POMDP model may be similar to a POMDP model except that a POMDP model models the vehicle and a proper subset, such as one, of external objects and a Dec-POMDP models the autonomous vehicle and the set of external objects.

A SSOCEM 330 may implement a POSG model, which may be a multi-agent model that models a distinct vehicle operational scenario. A POSG model may be similar to a Dec-POMDP except that the Dec-POMDP model includes a reward function for the vehicle and the POSG model includes the reward function for the vehicle and a respective reward function for each external object.

A SSOCEM 330 may implement a RL model, which may be a learning model that models a distinct vehicle operational scenario. A RL model may be similar to a MDP model or a POMDP model except that defined state transition probabilities, observation probabilities, a reward function, or any combination thereof, may be omitted from the model. Instead, for example, the RL model may be a model-based RL model that generates state transition probabilities, observation probabilities, a reward function, or any combination thereof based on one or more modeled or observed events.

In a RL model, the model may evaluate one or more events or interactions, which can include simulated events, and may generate, or modify, a corresponding model, or a solution thereof, in response to the respective event. Simulated events may include, for example, traversing an intersection, traversing a vehicle transportation network near a pedestrian, or changing lanes. An example of using a RL model to traverse an intersection includes the RL model indicating a candidate action for traversing the intersection. The autonomous vehicle then traverses the intersection using the candidate action as the vehicle control action for a temporal location. A result of traversing the intersection using the candidate action may be determined to update the RL model based on the result.

The autonomous vehicle operational management system 300 may include any number or combination of types of models. For example, the pedestrian-SSOCEM 331, the intersection-SSOCEM 332, the lane-change-SSOCEM 333, the merge-SSOCEM 334, and the pass-obstruction-SSOCEM 335 may be POMDP models. In another example, the pedestrian-SSOCEM 331 may be a MDP model and the intersection-SSOCEM 332 may be a POMDP model. The AVOMC 310 may instantiate any number of instances of the SSOCEMs 330 based on the operational environment data. A module 336 is shown using broken lines to indicate that the autonomous vehicle operational management system 300 may include any number or additional types of SSOCEMs 330.

One or more of the AVOMC 310, the operational environment monitors 320, or the SSOCEMs 330 may operate continuously or periodically, such as at a frequency of ten hertz (10 Hz). For example, the AVOMC 310 may identify a vehicle control action many times, such as ten times, per second. The operational frequency of each component of the autonomous vehicle operational management system 300 may be synchronized or unsynchronized, and the operational rate of one or more of the AVOMC 310, the operational environment monitors 320, or the SSOCEMs 330 may be independent of the operational rate of others.

Figure 4:
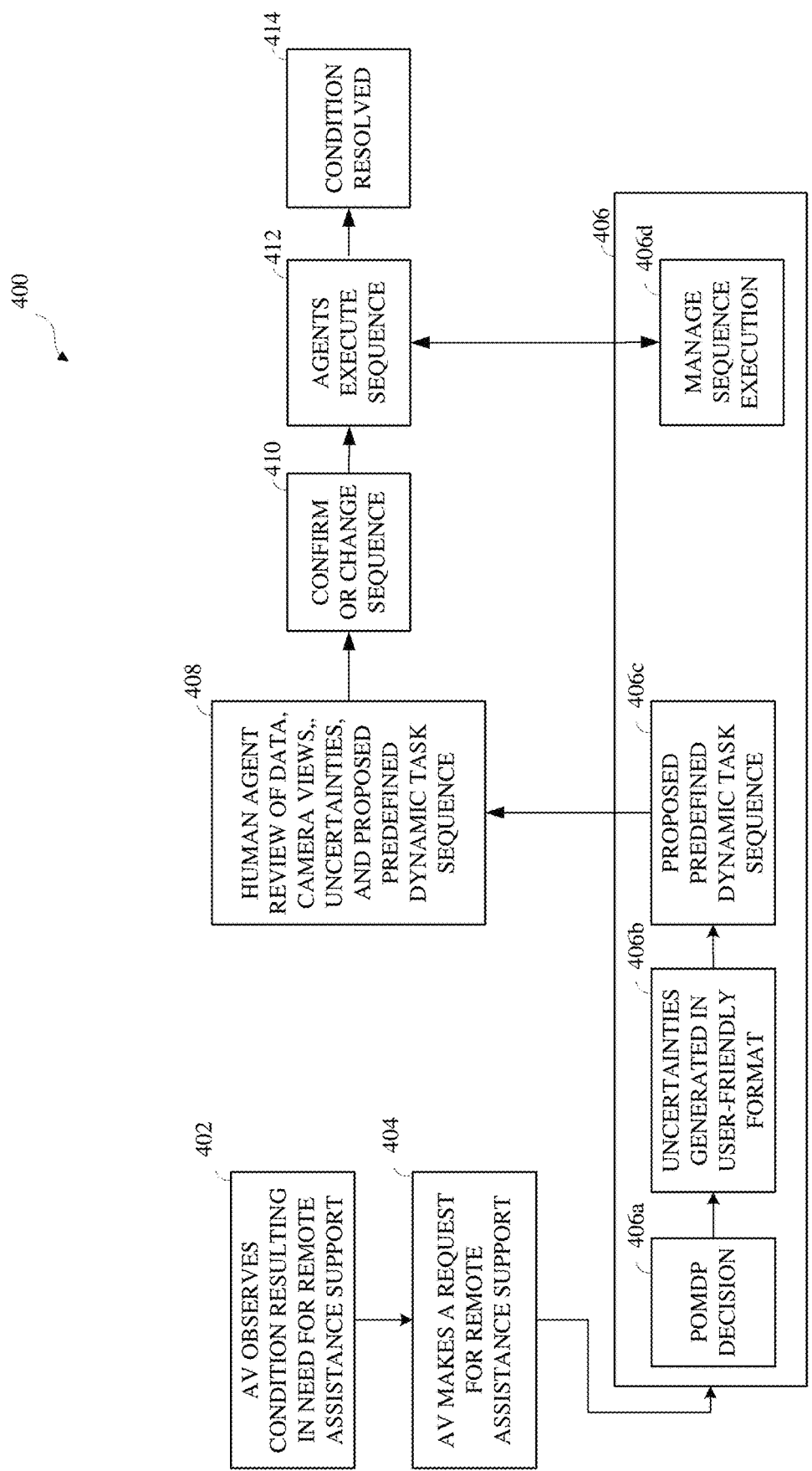
FIG. 4 is a functional block diagram of a system implementing remote assistance support using predefined dynamic task sequences according to implementations of this disclosure.

In general, the SSOCEMs 330 operate autonomously. Under certain conditions observed by the AV, however, an SSOCEM may not be able to reach a solution and may require human intervention or aid through remote assistance support. FIG. 4 is a functional block diagram of an apparatus or system 400 implementing the remote assistance support using predefined dynamic task sequences according to implementations of this disclosure. The system 400 may be used to describe a method of using predefined dynamic task sequences for human-AI decision-making in autonomous vehicle support.

Blocks 402 and 404 show, in part, the actions of an AV, such as the AV 100 or the AV 210, 211. The AV is one of multiple agents within the system 400. As shown in block 402, the AV may observe, experience, or otherwise identify a condition resulting in the need or desire for the remote assistance support. The AV may then make a request for remote assistance support at 404. This request may correspond to an SSOCEM of the AV not being able to reach a solution.

For example, in response to detecting an obstacle on the road (i.e., on a portion of a vehicle transportation network), an SSOCEM may issue a request for assistance to remote assistance support. In another example, a lane-traversal (or lane-change) SSOCEM may use lane markers to maintain an AV within a lane. In some situations, the lane-traversal SSOCEM may no longer be able to demarcate the lane boundaries, such as in a case where the sensors may be dirty or have malfunctioned or the lane markers are covered with snow or mud. The lane-traversal SSOCEM may request remote assistance support.

The request from the AV starts execution of an autonomous mobility agent of the multiple agents and a human-autonomy teaming (HAT) manager 406. Generally, the autonomous mobility agent is an entity that receives the request, and calls the HAT manager 406. The autonomous mobility agent may also perform functions related to the request such as computations, communications with the AV and fleet AVs, if any, communications (e.g., using a user interface) with the human agent, communications with other actors or agents within the network, or some combination of these functions, either on its own initiative or as tasks assigned to it within the predefined dynamic task sequence executed responsive to the request for remote assistance support. The autonomous mobility agent may comprise a processor, alone or with other computing logic, implementing an artificial intelligence, hardware, and/or software instructions to perform the method or portions of the method described herein. The autonomous mobility agent may be operated on any computer, such as a computer located at or incorporating the communication device 240.

The HAT manager 406 may comprise a processor, alone or with other computing logic, implementing an artificial intelligence, hardware, and/or instructions to perform the method or portions of the method described herein. The HAT manager 406 may be operated on any computer, such as a computer located at or incorporating the communication device 240.

The HAT manager 406 receives input from the AV related to the request. For example, the HAT manager 406 may receive decision data of one or more of the SSOCEMs of the AV. This is referred to as POMDP decision 406a in FIG. 4 to reflect that the SSOCEM providing the input may comprise a POMDP model. The input may be conditional probabilities as discussed above with regards to the SSOCEMs, or any other information related to the AV or to the condition that resulted in the request for remote assistance support. The input may be first received by the autonomous mobility agent and passed on to the HAT manager 406. Alternatively or additionally, the autonomous mobility agent may include its own SSOCEMs that receive input from the AV (e.g., sensor input) available at the time of the request, and determine decision data to pass to the HAT manager 406.

The HAT manager 406 initially selects and subsequently manages a predefined dynamic task sequence based on the condition resulting in the request (also referred to as a use case). Each use case may be associated with a respective use case class. A use case class is a broad category that groups one or more available predefined dynamic task sequences that use multiple agents to resolve a condition that falls within the class. This may be seen by reference to the table 500 of FIG. 5, which includes a list of available predefined dynamic task sequences for use when the condition is an obstruction (e.g., an obstruction SSOCEM such as pass-obstruction module 335 does not solve). The predefined dynamic task sequence initially selected by the HAT manager 406 may be one of a plurality of predefined dynamic task sequences using the same or different agents to resolve the condition.

In some implementations, the HAT manager 406 selects from all available predefined dynamic task sequences, regardless of class. In other implementations, the HAT manager 406, the autonomous mobility agent, or some combination of these entities assigns the condition to a use case class, and the HAT manager 406 selects only from the predefined dynamic task sequences associated with the class. For example, the use case classes may conform to the source of the request. In an example where a pedestrian SSOCEM such as the pedestrian module 331 causes the request for remote assistance support, the use case class may be "pedestrian". In some implementations, more than one source of a request for remote assistance support exists. For example, the existence of a pedestrian in or approaching an intersection may result in requests from both a pedestrian SSOCEM and an intersection SSOCEM, such as the pedestrian module 331 and the intersection module 332. Where there is more than one request, and where the available predefined dynamic task sequences are limited to the class of the use case, available predefined dynamic task sequences associated with each class may be considered by the HAT manager 406.

Selection of the initial predefined dynamic task sequence by the HAT manager 406 may be achieved by considering multiple factors. Factors that may be considered include but are not limited to the state of the AV, the understanding of the condition by the AV, the introspection of the AV regarding its uncertainties, organizational values (e.g., keep the AV moving, safety, etc.), previous human agent solutions, the available resources for decision-making, or some combination thereof. Each of these factors is described further below.

The HAT manager 406 may consider the understanding of the condition by the AV, such as what the input data from the AV indicates about the condition. Referring to FIG. 5, the columns labeled "on-road scenarios" and "scenario characteristics" may reflect understanding of an obstruction condition. The state of the AV (e.g., whether some or all sensors are functional, etc.) may be considered.

Another factor involved in the selection of the initial predefined dynamic task sequence by the HAT manager 406 may be introspection of the AV, which indicates uncertainties associated with the condition. These uncertainties may be contributing factors to the failure of an SSOCEM to solve. In some implementations, an uncertainty may result from a lack of human input in the autonomous vehicle operational management system 300, or a lack of information available to the AV to address the uncertainty. FIG. 5 refers to these with the label "AI uncertainties" that are associated with respective predefined dynamic task sequences. To address an uncertainty, a task may be assigned to an agent in a predefined dynamic task sequence. Again referring to FIG. 5, the column labeled "inputs" describes tasks that may be included in a respective predefined dynamic task sequence to address the uncertainties from the column labeled "AI uncertainties." For example, the predefined dynamic task sequence named "wait behind" in FIG. 5 lists two uncertainties. The first is whether the obstruction results from a legitimate obstructant, which may indicate in this example whether or not the obstacle causing the obstruction is one that is passable, e.g., is a real obstacle instead of an error, is a socially acceptable obstacle to pass, etc. The second is whether or not it is desirable to wait for the obstacle (and hence the obstruction) to clear. In each case, the uncertainty may be eliminated or reduced by tasking an agent to address the uncertainty. In the case of the first uncertainty, the "wait behind" predefined dynamic task sequence may include a task assigned to a human agent assessing the obstruction status. In the case of the second uncertainty, the "wait behind" predefined dynamic task sequence may include a task assigned to the autonomous mobility agent to estimate the time to clear the obstruction using, for example, data not available to AV requesting the remote assistance support such as information from infrastructure cameras, other AVs near to the location of the AV, etc. Where a task may be assigned to a human agent, the uncertainties may be generated in a user-friendly format at 406b, which are shown by example in FIGS. 6B-6D hereinbelow.

The particular technique by which the HAT manager 406 generates a user-friendly format for the uncertainties, essentially transforming an uncertainty into a request for help from the human agent that constitutes a task for the human agent, is not limited. In one relatively straightforward implementation, an uncertainty is associated with a predefined short phrase or sentence that is used each time the uncertainty is associated with a use case and a corresponding predefined dynamic task sequence. The use of the uncertainties in this manner supports the function of alerting the human agent quickly to the reason they are being looped into the problem, and what the HAT manager 406 needs the human agent to do.

Other factors involved in the selection of the initial predefined dynamic task sequence by the HAT manager 406 may include external factors such as values of the organization or individual associated with the AV. For example, the factors may include the value placed on keeping the AV moving, safety, etc. Other external factors may include what sources are available for decision-making (e.g., infrastructure cameras, etc,) at the location within the vehicle transportation network where the condition resulting in a request is observed.

One possible technique for selection of the initial predefined dynamic task sequence may be to use machine learning to train the HAT manager 406. That is, for example, the HAT manager 406 may be or include a neural network (e.g., a deep-learning neural network, etc.) that matches the use case or condition with an available predefined dynamic task sequence. The neural network may be trained by a machine learning component that includes examples, such as 1000 examples or more, of requests for remote support assistance made to an autonomous mobility agent for each condition or its class, along with AV data at the time of the request, the factors above as appropriate, and data associated with the resolution of the condition by, e.g., a human agent at the autonomous mobility agent, such as the use of tasks that are included in available predefined dynamic task sequences. Thus, previous solutions by a human agent may also be considered.

In some implementations, some of the factors described above may be used by the HAT manager 406 to exclude one or more predefined dynamic task sequences before the HAT manage 406 selects from any remaining predefined dynamic task sequences. For example, if a predefined dynamic task sequence requires a passenger within the AV, and there is no passenger within the AV (e.g., from information received with the request for remote assistance support), that sequence may be omitted from the available predefined dynamic task sequences.

The above description describes selection of an initial predefined dynamic task sequence. This may correspond to the best choice as indicated by the trained model (e.g., the AI) of the HAT manager 406. The best choice may be the predefined dynamic task sequence that maximizes the chance of a desired outcome (or multiple desired outcomes) while resolving the condition that caused the request. For example, the best choice may be the predefined dynamic task sequence that maximizes safety while resolving an obstruction to the path of the AV. Other metrics for the desired outcome may be used. Further, it is desirable but not necessary for the HAT manager 406 to select one or more (e.g., two) additional predefined dynamic task sequences. For example, the HAT manager 406 may rank the available predefined dynamic task sequences based on their likelihood of achieving the desired outcome(s) while resolving the condition, and select the top three at 406c for presentation to the human agent.

The HAT manager 406c may present a predefined dynamic task sequence selected at 406c by initiating a dialogue associated with the predefined dynamic task sequence. The dialogue may be conveyed to a human agent by any type of user interface such as a display, a speaker, etc. The dialogue may be conveyed by a user interface of the HAT manager 406c, or may be passed to the autonomous mobility agent to generate a user interface conveying the dialogue (e.g., by including the dialogue). The dialogue prompts the human agent to confirm, modify, or change the predefined dynamic task sequence. In this way, the dialogue may be considered the first task of any predefined dynamic task sequence. An example of a user interface in the form of a graphical user interface that includes the dialogue may be seen by reference to FIGS. 6A-6E.

Figure 6A:
FIGS. 6A-6E are screenshots illustrating an example user interface for implementing a predefined dynamic task sequence in response to an obstruction.

FIG. 6A is a screenshot of a graphical user interface that may be generated by an autonomous mobility agent responsive to receipt of a request for remote assistance support for an AV, for example at 404 in FIG. 4. The user interface displays, in FIG. 6A, the AV 600 that is requesting support superimposed on a map of a portion of a vehicle transportation network. The user interface also displays an indicator 602 of the condition observed by the AV 600, here a lane obstruction, and an input 604 through which the human agent may initiate remote assistance support. This indicator 602 is referred to as a ticket herein, so the input 604 is labeled "open ticket". The indicator 602 optionally includes some details regarding the AV 600, such as the amount of time that has elapsed since the AV 600 stopped and whether or not the AV 600 is occupied. The ticket may be sent to the HAT manager 406 from the autonomous mobility agent, desirably at the same time the autonomous mobility agent displays the indicator 602 and input 604 such that the HAT manager 406 will be able to consider and select a predefined dynamic task sequence for consideration by the human agent when the human agent opens the ticket by engaging with the input 604. In FIG. 6A, a status window 606 of AVs is displayed. This is an optional window of the display that may be useful when the autonomous mobility agent is monitoring a fleet, AVs within a certain region of the vehicle transportation network, or both.

Figure 6B:
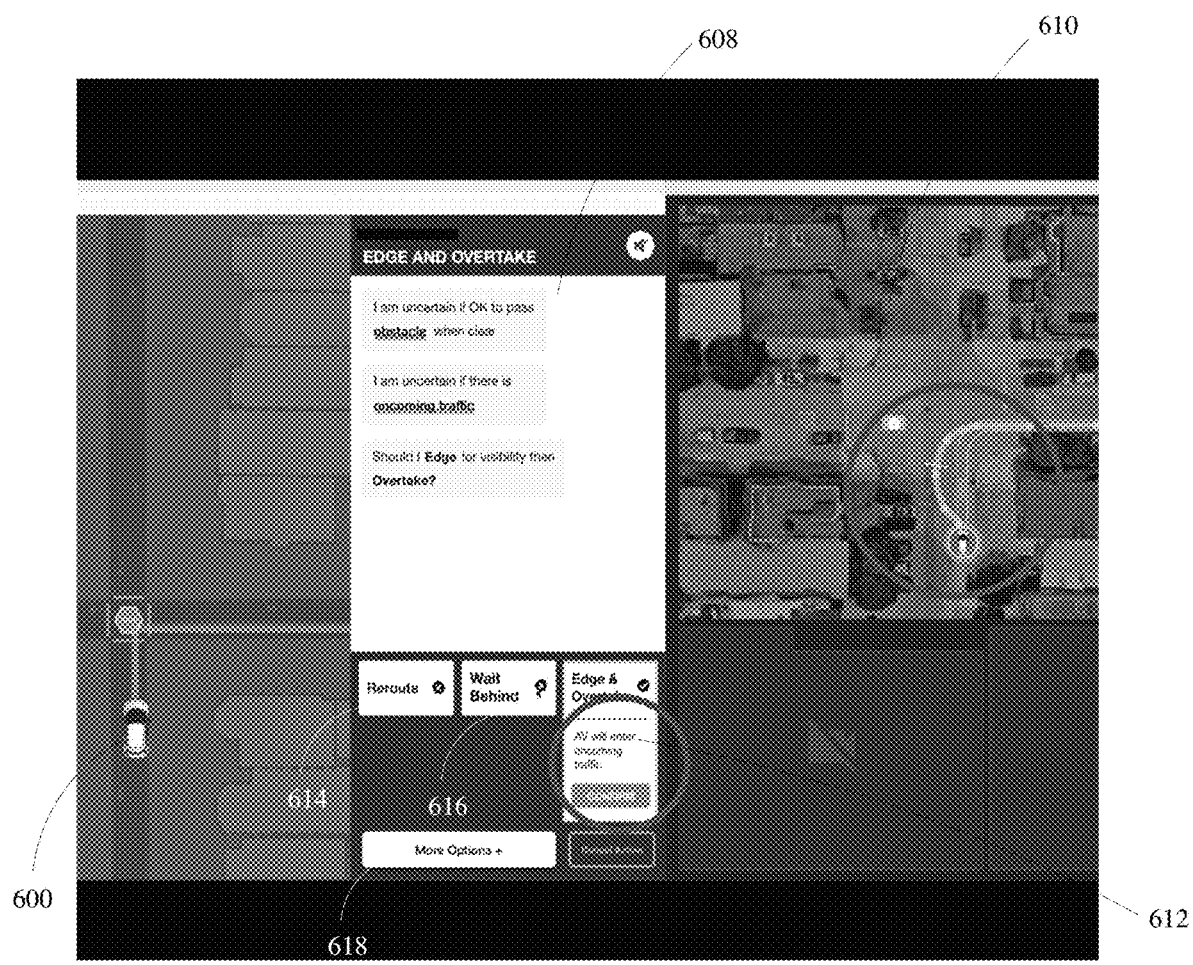

FIG. 6B is a screenshot subsequent to the screenshot of FIG. 6A. In this screenshot, the user interface includes an optional close-up view of the AV 600 superimposed on the map from FIG. 6A. The dialogue is shown as a dialogue window 608 within the user interface. The dialogue may include one or more of the uncertainties generated at 406b, in addition to the identification of the predefined dynamic task sequence. In this example, the initial selection from the available predefined dynamic task sequences is "edge and overtake". As can be seen by referring back to FIG. 5, there are two AI uncertainties indicated. The user-friendly uncertainties generated at 406b by the HAT manager 406 address each of the AI uncertainties—namely, whether there is a legitimate obstructant and whether it is acceptable to edge for more visibility. Note that these uncertainties may be considered tasks for the human agent, e.g., to assess the obstruction status and to assess the likelihood of vehicles in a blind spot of the AV 600 (e.g., oncoming traffic).

To aid the human agent in determining whether to confirm the predefined dynamic task sequence, here the "edge and overtake" predefined dynamic task sequence, the user interface may also include a representation of how the predefined dynamic task sequence is projected to resolve the condition. The autonomous mobility agent may be delegated a task to generate this representation. For example, the autonomous mobility agent may perform a task of determining projected positions for the AV while the condition is being resolved using its implementation of an autonomous vehicle operational management system 300. Then, as shown in FIG. 6B, the representation 610 may be generated using this information. The representation 610 comprises the projected positions for the AV while the condition is being resolved overlaying a display of a portion of the vehicle transportation system. In the "edge and overtake" predetermined dynamic task sequence, the projected positions form a path to edge and then overtake (i.e., pass) the obstacle causing the obstruction. If confirmed, the HAT manager 406 may delegate the task of following the path as indicated by the projected positions to the AV 600. Alternatively, the HAT manager 406 may delegate the task of following the path as indicated by the projected positions to the autonomous mobility agent, the human agent, or both, which in turn executes the task by remote control of the AV 600.

In some implementations, the dialogue window 608 of the user interface may include a consequence 612 of executing the predefined dynamic task sequence. In FIG. 6B, for example, the path of the AV 600 associated with the "edge and overtake" predetermined dynamic task sequence (circled in the representation 610) has the consequence 612 that the AV 600 will enter oncoming traffic. Although not shown in the figure, the user interface may display camera images from the AV 600, infrastructure camera devices, other nearby AVs, or some combination thereof.

Referring back to FIG. 4, the human agent may review data (e.g., from the ticket), one or more camera views, the uncertainties, and the proposed predefined dynamic task sequence at 408 (such as through the user interface) to determine whether to confirm the predefined dynamic task sequence as a selected predefined dynamic task sequence or to select or change to another predefined dynamic task sequence of the plurality of predefined dynamic task sequences as the selected predefined dynamic task sequence at 410.

There are different techniques available to review and change the predefined dynamic task sequence. Returning to FIG. 6B, for example, the dialogue window 608 includes the initial predefined dynamic task sequence, here the "edge and overtake" predefined dynamic task sequence. As described above, however, the HAT manager 406 may determine more than one predefined dynamic task sequence (e.g., through a ranking process). FIG. 6B includes two tabs 614, 616 associated with respective alternative predefined dynamic task sequences for an obstruction, namely a "reroute" predefined dynamic task sequence and a "wait behind" predefined dynamic task sequence referred to in FIG. 5.

Figure 6C:
Figure 6D:

The human agent may review these options by selecting each of the tabs 614, 616 before confirming the initial, or preferred, predefined dynamic task sequence selected by the HAT manager 406, or before changing the predefined dynamic task sequence. The screenshot of FIG. 6C shows the user interface after selecting the tab 614, and the screenshot of FIG. 6D shows the user interface after selecting the tab 616. Like the screenshot of FIG. 6B, the dialogue is shown as the dialogue window 608 within the user interface in each of FIGS. 6C and 6D. The uncertainties of the initial predefined dynamic task sequence are unchanged in this example for comparison with the alternative predefined dynamic task sequences.

A representation 610 may be generated as described with regards to FIG. 6B. In the "reroute" predefined dynamic task sequence shown in FIG. 6C, the projected positions for the AV 600 while the condition is being resolved that overlay the display of the portion of the vehicle transportation system form a path that comprises a U-turn by example. If confirmed, the HAT manager 406 may delegate the task of following the path as indicated by the projected positions to the AV 600. Alternatively, the HAT manager 406 may delegate the task of following the path as indicated by the projected positions to the autonomous mobility agent, the human agent, or both, which in turn executes the task by remote control of the AV 600. In the "wait behind" predefined dynamic task sequence shown in FIG. 6D, the projected positions for the AV 600 while the condition is being resolved that overlay the display of the portion of the vehicle transportation system are located at the same position. The label "wait behind" may be added to the representation 610 presented by the user interface. The condition may be resolved when the obstacle moves while the AV 600 is waiting. It is also possible that the "wait behind" predefined dynamic task sequence includes a task to use the dialogue window 608 to seek confirmation of the "wait behind" predefined dynamic task sequence or a change to an alternative predefined dynamic task sequence that is delegated from the HAT manager 406 in the event conditions change (e.g., as monitored by a task delegated to the autonomous mobility agent according to the "wait behind" predefined dynamic task sequence) or a defined amount of time passes (e.g., as defined in the "wait behind" predefined dynamic task sequence).

In a like manner as FIG. 6B, the dialogue window 608 of the user interface of each of FIGS. 6C and 6D may optionally include a consequence 612 of executing the predefined dynamic task sequence. In FIG. 6C, for example, the consequence 612 to the AV 600 associated with the "reroute" predetermined dynamic task sequence (circled in the representation 610) as compared to the "edge and overtake" predetermined dynamic task sequence is an increase in trip time. In FIG. 6D, for example, the consequence 612 to the AV 600 associated with the "wait behind" predetermined dynamic task sequence (circled in the representation 610) as compared to the "edge and overtake" predetermined dynamic task sequence is that the AV 600 will have to wait for the obstacle to move. In some implementations, the consequence 612 associated with the "wait behind" predetermined dynamic task sequence may include an estimated time before the trip may resume.

Figure 6E:
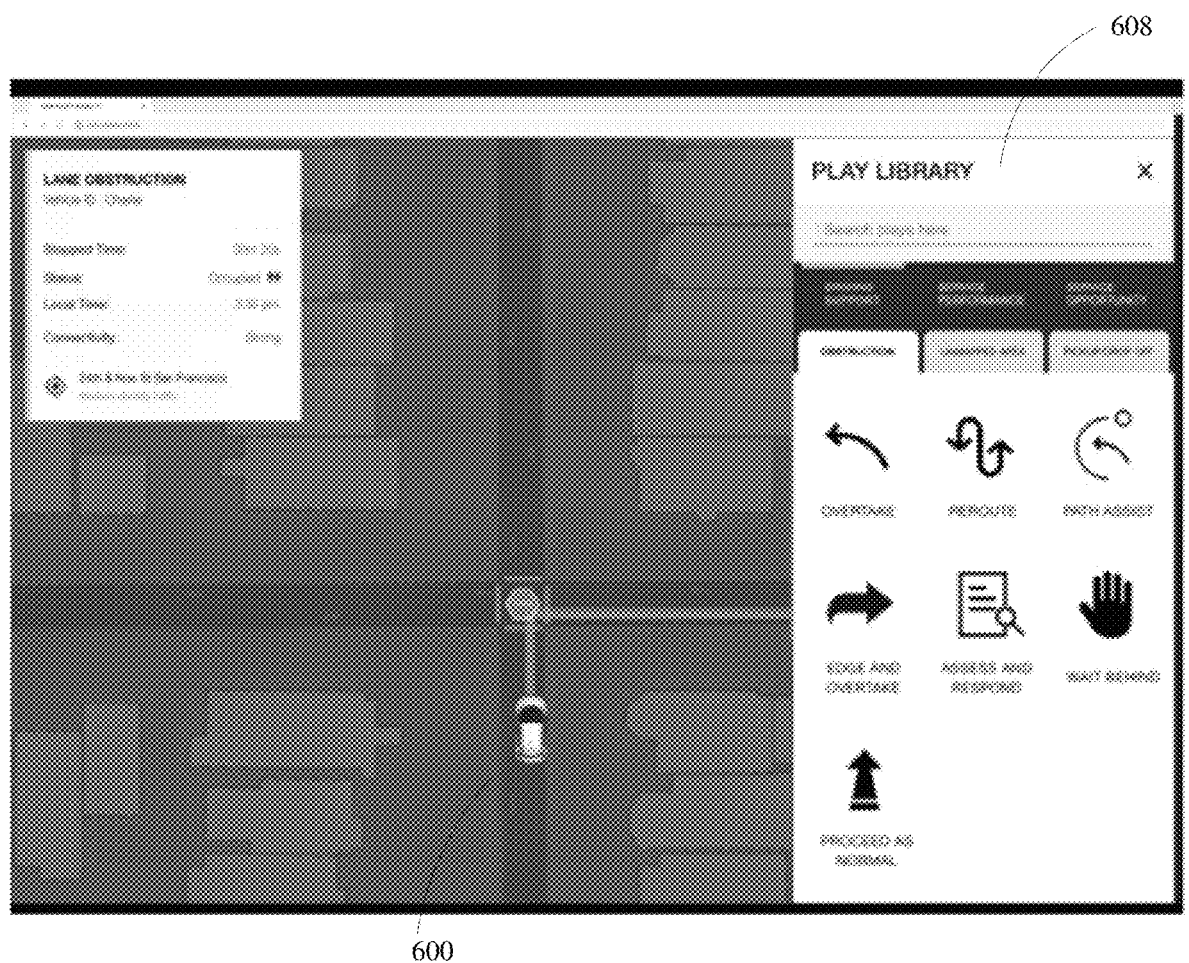

FIG. 6E is a screenshot that illustrates another technique for the human agent to review available predefined dynamic task sequences and optionally change the initial the predefined dynamic task sequence. Referring back to FIG. 6B, another tab 618, which is labeled "more options", may change the dialogue window 608 to display a library of available predefined dynamic task sequences as shown in FIG. 6E. That is, the HAT manager 406 may include a memory that stores a plurality of predetermined dynamic task sequences within the library (referred to as a play library in FIG. 6E), and the user interface enables access to the library by the human agent (e.g., through the dialogue window 608). The human agent may select any of the predefined dynamic task sequences associated with obstructions, similar to those described in FIG. 5. FIG. 6E also includes a predefined dynamic task sequence named "proceed as normal", which may indicate that a non-existent obstruction was detected. The tasks associated with this sequence may include prompting the human agent to close the ticket, and transferring control back to the AV 600 (which may be considered an agent within any of the predefined dynamic task sequences. The dialogue window 608 may also include a search function as shown in FIG. 6E, which can locate a predefined dynamic task sequence not associated with obstructions that may be able to resolve the condition based on the examination of the human agent at 408.

Referring back to FIG. 4, whether the human agent confirms the initial predefined dynamic task sequence presented by the HAT manager 406 as the selected predefined dynamic task sequence or changes to another predefined dynamic task sequence as the selected predefined dynamic task sequence at 410, the agents execute the selected predefined dynamic task sequence at 412 with the HAT manager 406 managing the sequence at 406*d* to resolve the condition at 414. There are multiple ways in which a sequence may be defined, and hence managed by the HAT manager 406. An example of the tasks, subtasks, and relationships and dependencies of a predefined dynamic task sequence 700 named "reroute" corresponding to that described in FIG. 5 is shown in FIG. 7.

Figure 7:
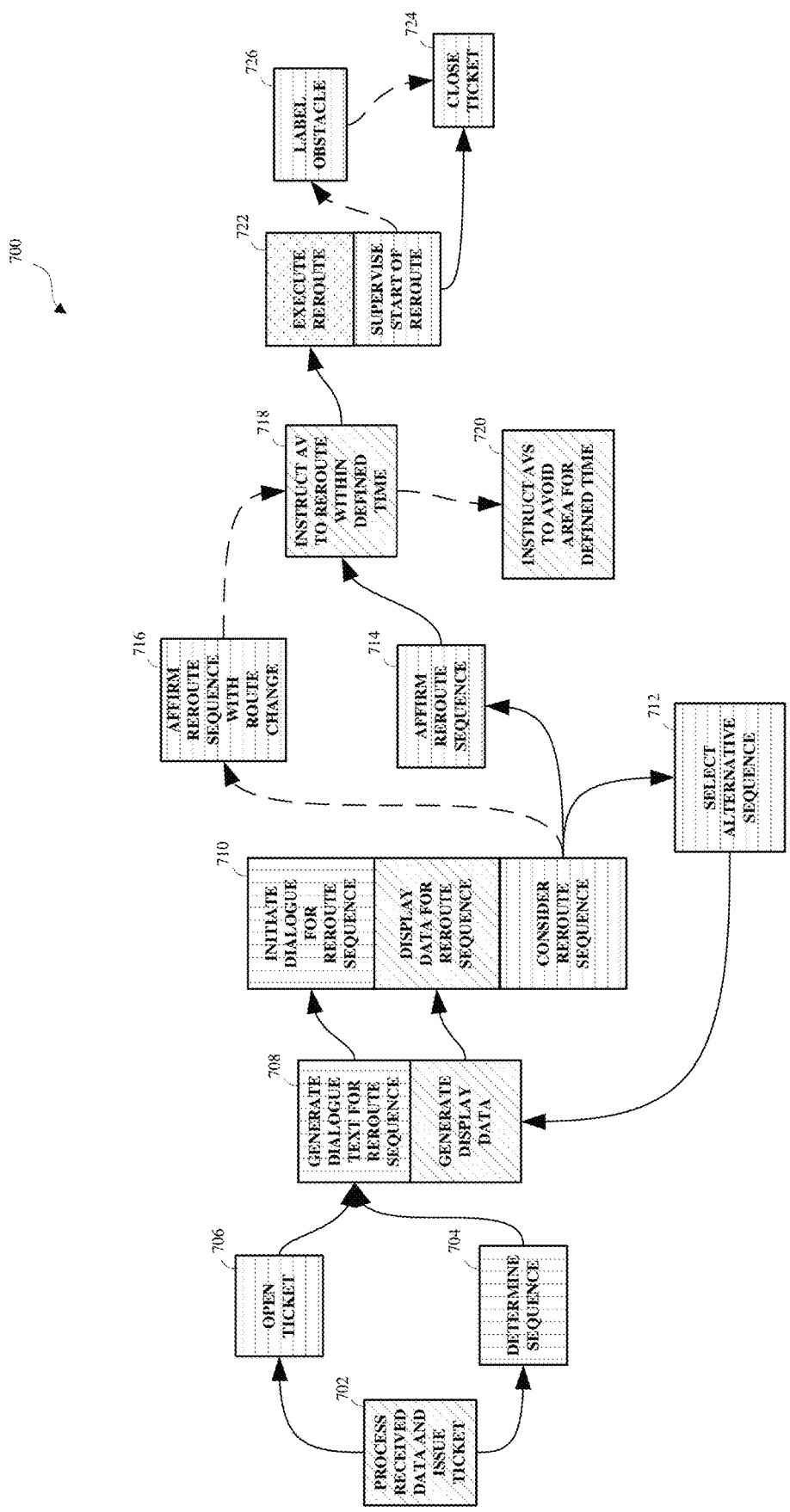
FIG. 7 is a diagram of an example predefined dynamic task sequence.

In FIG. 7, tasks or actions of the autonomous mobility agent are indicated by diagonal cross-hatching, tasks or actions of the HAT manager 406 are indicated by vertical cross-hatching, tasks or actions of the human agent are indicated by horizontal cross-hatching, and tasks or actions of the AV are indicated by a dotted background. FIG. 7 begins with the receipt of a request for assistance from an AV. The autonomous mobility agent receives and processes the request at 702, including the use case data forwarded from the AV. As shown in the example of FIG. 6A, the autonomous mobility agent also presents a ticket to a human agent in a user interface indicating the request. The autonomous mobility agent also calls the HAT manager 406 at 704 to suggest a predefined dynamic task sequence (e.g., by forwarding the information related to ticket to the HAT manager 406).

In this example, the information received by the HAT manager 406 is that the AV has reached a full blocking, static obstacle. As can be seen by reference to FIG. 5, this scenario is associated with the "reroute" predefined dynamic task sequence. After the human agent opens the ticket at 706, the HAT manager 406 begins executing the predefined dynamic task sequence 700.

The HAT manager 406 generates the dialogue text for the suggested predefined dynamic task sequence at 708, here the "reroute" predefined dynamic task sequence. The HAT manager 406 further delegates a task to the autonomous mobility agent of generating display data for the predefined dynamic task sequence 700, and displaying that data. The display data to be generated is dictated by parameters of the predefined dynamic task sequence, here the "reroute" predefined dynamic task sequence. In this example, generating the display data includes a task for the autonomous mobility agent of determining a route for the rerouting of the AV so that it can be displayed.

At 710, the HAT manager 406 initiates a dialogue with the human agent for the predefined dynamic task sequence 700, and the autonomous mobility agent displays the data generated for the predefined dynamic task sequence 700. More specifically, initiating the dialogue at 710 causes a user interface of the HAT manager 406 (e.g., a dialogue window in a display) to present visual or audio direction to the human agent for examination and consideration of uncertainties associated with the predefined dynamic task sequence 700. The uncertainties may conform to those shown in FIG. 5 for the "reroute" predefined dynamic task sequence. As a result, the presentation to the human agent of the uncertainties may include a statement such as shown in FIG. 6B ("I am uncertain is OK to pass obstacle when clear") to confirm that a legitimate obstructant exists and a statement such as "I am uncertain whether U-turns are OK" to assess whether a proposed reroute maneuver using a U-turn is acceptable. Each of these represents a task for the human agent to consider these points.

The autonomous mobility agent may execute its task of displaying the data at 710 by controlling its user interface to display map data, a representation of how the predefined dynamic task sequence 700 is projected to resolve the condition (e.g., the proposed route for the rerouting of the AV), a consequence of executing the predefined dynamic task sequence 700, or any combination of these elements within one or more windows in the display as shown by the examples of the combined display of three respective user interfaces shown in FIGS. 6B-6E.

At 710, the human agent may consider this information to make a scene assessment in view of the uncertainties. That is, the human agent considers whether to accept the "reroute" predefined dynamic task sequence suggested by the HAT manager 406.

The human agent may, instead of affirming the "reroute" predefined dynamic task sequence, select an alternative predefined dynamic task sequence at 712. For example, where the HAT manager 406 displays one or more alternatives to the preferred "reroute" predefined dynamic task sequence, the human agent may select one of the displayed alternatives as described with regards to FIGS. 6C and 6D. Where the HAT manager 406 includes access to a library of predefined dynamic task sequences as described with regards to FIG. 6E, the human agent may select one of the predefined dynamic task sequences available from the library. The HAT manager 406 can then begin executing the new predefined dynamic task sequence beginning with generating dialogue text for the new sequence and delegating the task of generating display data for the new sequence to the autonomous mobility agent (e.g., as described at 708), and then initiating the dialogue and tasking the autonomous mobility agent with displaying the data for the new sequence for consideration by the human agent (e.g., as described at 710). Tasks thereafter would depend upon which predefined dynamic task sequence was selected by the human agent.

Alternatively, the human agent can accept the suggestion from the HAT manager 406 of the "reroute" predefined dynamic task sequence. The "reroute" predefined dynamic task sequence in this example includes a task for the autonomous mobility agent of determining alternative routes. Where there is only one route available to reroute the AV, the human agent may affirm the "reroute" predefined dynamic task sequence at 714. Alternatively, the autonomous mobility agent may include one or more alternative routes other than a preferred, suggested route when displaying data at 710, and the human agent may affirm the "reroute" predefined dynamic task sequence at 716. The dashed lines indicate that 716 is a conditional task in the "reroute" predefined dynamic task sequence (i.e., it is conditioned on the existence of other routes). While this description assumes that alternative routes are determined by the autonomous mobility agent, it is also possible for the human agent to interact with the user interface of the autonomous mobility agent to modify one or more points of the suggested route before affirming the selection at 716.

Regardless of the selected route, affirming the "reroute" predefined dynamic task sequence results the HAT manager 406 delegating a task of instructing the AV to the autonomous mobility agent. The autonomous mobility agent instructs the AV to reroute according to the route at 718. These instructions can impose limitations on the AV. For example, the autonomous mobility agent may instruct the AV to follow the route after confirming that traffic is clear, as long as the AV can move within a defined time, such as 30 seconds. Although not shown in FIG. 7, such limitations may result in the HAT manager 406 delegating another request that the human agent again confirm the selected sequence or select an alternative sequence to resolve the condition (e.g., such as when the time expires). The AV executes the instruction at 722 by turning on a blinker, looking for a clearing in the traffic, and executing the turn to reroute. In this example, the human agent is also tasked at 722 to supervise while the AV begins its turn. The human agent closes the ticket at 724 in recognition that the condition is resolved with respect to the AV.

As can be seen in FIG. 7, there is more than one conditional task in the "reroute" predefined dynamic task sequence. For example, when the human agent affirms the "reroute" predefined dynamic task sequence at 714 or 716, hence affirming that there is an actual obstacle that triggered the request for remote assistance support, the HAT manager 406 issues an additional task to the autonomous mobility agent depending upon whether the autonomous mobility agent is being used to manage a fleet. At 720, for example, the autonomous mobility agent instructs AVs in the fleet to avoid an area encompassing the obstacle (such as an intersection) for a defined amount of time. For example, the period of time may be 5 minutes. The AVs in the fleet receive and comply with the instruction by determining paths that include the area around the obstacle for the period of time. This may involve an AV diverting from its existing path that includes the area by generating a new path.

Another conditional task may be undertaken by the HAT manager 406 itself. As already described, as part of the encapsulated set of interactive behaviors that constitute a predefined dynamic task sequence, the human agent may be prompted to complete certain subtasks (e.g., to assess, label or evaluate specific elements or data in a scene that are difficult for an AI). At 726, the HAT manager may assign a task to label the condition (e.g., the obstacle) for input to a machine-learning algorithm. This comprises an input sample that may, together with other samples, allow predefined dynamic task sequences involving obstruction use cases to be further refined over time.

Reliance on human assistance (i.e., intervention) in the operation of an AV can be costly. For example, it may take a relatively long amount of time for a human agent to respond to a request for assistance from an AV. Further, as the number of requests for assistance from AVs increases, such as where a human agent is operating at an autonomous mobility agent servicing a fleet of AVs, this amount of time may increase. In this latter situation, the number of human agents required to handle the requests is likely to increase with the number of requests. By using the HAT manager 406 to initially suggest, select, or otherwise determine a predefined dynamic task sequence, and then manage execution of the sequence by the agents described in the sequence, efficiency of the human agent and the overall remote assistance support increases.

More generally, the disclosure addresses problems unique to the vehicle transportation system domain by giving the role of the supervisor that flexibly delegates tasks to the AI of the HAT manager 406, instead of to a human agent. For example, this allows extremely fast (e.g., ~10 to 20 seconds versus 1 to 2 minutes) human-AI co-decision-making that befits real-time action on public roadways. Further, this addresses a unique need to insert human judgment into the decision-making process for subtasks of some sequences other than or in addition to the meta-task or main task of deciding how tasks should be delegated. That is, as part of the encapsulated set of interactive behaviors that constitute the plurality of predefined dynamic task sequences, the human agent may be prompted to complete certain subtasks in addition to concurring, modifying, or changing the initial predefined dynamic task sequence after that sequence is determined by the HAT manager 406. For example, inclusion of the human agent may be needed for a task of informing the AV about whether or not an obstacle in front of the AV is a socially acceptable entity to try to pass (e.g., a funeral procession, etc.).

The teachings herein also recognize that, in some conditions experienced or observed by the AV, there may be unique actors or agents within the network (e.g., other than the AV and human agent) that desirably perform tasks or who are the targets of tasks within a sequence to resolve the condition that resulted in the request for remote assistance support. These unique actors or agents may include public infrastructure cameras, emergency response personnel, etc. For example, tasks of a sequence may include seeking data input from infrastructure cameras or roles for emergency personnel on the scene for a use case class designated emergency.

Further, this disclosure provides the ability to delineate effects of decisions about a condition experienced by one AV to other actors or agents within the network. As described above with regards to obstruction, for example, when a decision is made about a condition for one AV of a fleet, a task of the selected sequence may dictate an effect of the decision to other AVs in the fleet.

The teachings of this disclosure provide the ability to provide predefined dynamic task sequences particularly useful for fleets by including specific tasks within a sequence that may be applied across all AVs encountering similar conditions. For example, tasks may involve defining what data a human agent should take in from off-board systems though an interface, how the human agent will intake and consider that data, the form and content of decision-making by the human agent, what commands the human agent can give an AV, the capabilities the human agent has to influence the decision loop, or some combination of these tasks. The tasks may include what action an AV will perform on the road, constraints on that action, in what situations the AV will call for help, what data the AV can or should transmit to assist remote decision-making, or some combination of these tasks. Tasks can also include tasks for the HAT manager, such as the HAT manager 406, the autonomous mobility agent, or both, to describe its respective activities, such as providing data about the condition taken in from AV, what is done with that data, what information is being presented to a human agent, what inputs are being asked for from a human agent, or any combination of these tasks.

The disclosure improves existing systems for remote support between a human agent and an AI by using shared scripts that can deal with common use case classes efficiently and safely. Each use case class may be dealt with using similar logic and grammar.

While the above implementations discuss that the AV request for remote assistance support at 404 is prompted by a SSOCEM of the AV (e.g., by failure of the SSOCEM to reach a solution during a driving condition), the AV request may be prompted by conditions not necessarily within the autonomous control of the AV. In some implementations, the AV request may be a result of a condition observed by monitoring external behavior or in-cabin behavior at 402. For example, the AV may observe dangerous behavior by a passenger, such as putting a head outside of the window while the AV is moving. As another example, the AV may receive an input from a passenger with a request for remote support assistance. The input may thus comprise visual, audible, haptic, or any other input from interior or exterior sensors of the AV, such as the sensors 136. In such examples, the autonomous mobility agent may receive a request that includes the source of the request (e.g., an internal sensor, an external sensor, images, sounds, etc.) in addition to or instead of the observed condition. The human agent can then specify a class for the use case to the HAT manager 406 so that the HAT manager 406 can consider and select or suggest an initial dynamic predefined task sequence related to the use case class. For example, an AV request at 404 prompted by a passenger or in-cabin sensed information or data may belong to one use case class, while an AV request at 404 prompted by externally-sensed information or data may belong to a different use case class. As another example, emergency conditions observed by the AV may be grouped (e.g., an accident). Other variations in the designation of classes are possible. Alternatively, the HAT manager 406 can consider the input and determine the class for the use case before considering the plurality of dynamic predefined task sequences for the use case class.

The above implementations describe the HAT manager 406 and the autonomous mobility agent as being separate entities. This is one possible arrangement, and is so described because the HAT manager 406 and the autonomous mobility agent serve different purposes. In some implementations, however, the functions of the HAT manager 406 and the autonomous mobility agent may be performed by a single entity.

The above implementations describe the HAT manager 406 and the autonomous mobility agent as being located remotely from the AV to provide remote support assistance. This is not required. Remote support assistance is intended to encompass any support assistance that seeks input from a human agent as part of a predefined dynamic task sequence. In some examples, the remote support assistance may be performed in whole or in part at the AV itself, e.g., separately (remotely) from the autonomous vehicle operational management system 300 operation described above. For example, the HAT manager 406, the autonomous mobility agent, or both, may be implemented by the AV, such as by processor 133 and other components of the AV 100, or by the one or more personal electronic devices 252/254/262/264, such as a smartphone 252/262 or a computer 254/264, of the entity 250, 250 of the corresponding vehicle 210/211 via a direct or indirect communication link.

The human agent may be a human agent that is remote from the AV, such as a human agent at the autonomous mobility agent described above, a passenger in the AV, or both. For example, where the lane-traversal or lane-change SSOCEM can no longer demarcate lane boundaries, an available predefined dynamic task sequence may include a task to request that a passenger of the AV assume control of the AV.

As used herein, the terminology "instructions" may include directions or expressions for performing any method, or any portion or portions thereof, disclosed herein, and may be realized in hardware, software, or any combination thereof. For example, instructions may be implemented as information, such as a computer program, stored in memory that may be executed by a processor to perform any of the respective methods, algorithms, aspects, or combinations thereof, as described herein. Instructions, or a portion thereof, may be implemented as a special purpose processor, or circuitry, that may include specialized hardware for carrying out any of the methods, algorithms, aspects, or combinations thereof, as described herein. In some implementations, portions of the instructions may be distributed across multiple processors on a single device, on multiple devices, which may communicate directly or across a network such as a local area network, a wide area network, the Internet, or a combination thereof.

As used herein, the terminology "example", "embodiment", "implementation", "aspect", "feature", or "element" indicates serving as an example, instance, or illustration. Unless expressly indicated, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "determine" and "identify", or any variations thereof, includes selecting, ascertaining, computing, looking up, receiving, determining, establishing, obtaining, or otherwise identifying or determining in any manner whatsoever using one or more of the devices shown and described herein.

As used herein, the terminology "or" is intended to mean an inclusive "or" rather than an exclusive "or" unless specified otherwise, or clear from context. In addition, the articles "a" and "an" as used in this application and the appended claims should generally be construed to mean "one or more" unless specified otherwise or clear from context to be directed to a singular form.

Further, for simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure. Although aspects, features, and elements are described herein in particular combinations, each aspect, feature, or element may be used independently or in various combinations with or without other aspects, features, and elements.

The above-described aspects, examples, and implementations have been described in order to allow easy understanding of the disclosure are not limiting. On the contrary, the disclosure covers various modifications and equivalent arrangements included within the scope of the appended claims, which scope is to be accorded the broadest interpretation so as to encompass all such modifications and equivalent structure as is permitted under the law.

What is claimed is:

1. An apparatus for traversing a vehicle transportation network by an autonomous vehicle (AV), comprising:
    a human-autonomy teaming manager that is remote from the vehicle and comprises a first processor configured to:
        select a predefined dynamic task sequence that is responsive to a condition experienced by the AV while traversing from a starting location to an ending location within the vehicle transportation network, wherein the condition results in a request for assistance from the AV, the condition is associated with a use case class of a plurality of use case classes, and the predefined dynamic task sequence is one of a plurality of predefined dynamic task sequences that delegates its tasks to multiple agents to resolve the condition;
        initiate a dialogue of the predefined dynamic task sequence that prompts a human agent of the multiple agents to confirm the predefined dynamic task sequence as a selected predefined dynamic task sequence or select an other predefined dynamic task sequence grouped in the use case class;
        provide, to an interface accessible to a human agent of the multiple agents, access to a library through a dialogue window, wherein the library stores available predefined dynamic task sequences including the plurality of predefined dynamic task sequences, and each predefined dynamic task sequence of the available predefined dynamic task sequences is for use with a respective use case class of the plurality of use case classes;
        receive, from the interface accessible to the human agent, an input responsive to the dialogue, wherein the input confirms the predefined dynamic task sequence as the selected predefined dynamic task sequence or selects the other predefined dynamic task sequence as the selected predefined dynamic task sequence; and manage the selected predefined dynamic task sequence to resolve the condition.

2. The apparatus of claim 1, further comprising:
an autonomous mobility agent of the multiple agents comprising a second processor configured to, responsive to the human-autonomy teaming manager initiating the dialogue, generate a display including the interface, the interface including the dialogue, wherein the autonomous mobility agent is remote from the AV.

3. The apparatus of claim 2, wherein the dialogue includes an uncertainty associated with the predefined dynamic task sequence to be resolved that is a task of the predefined dynamic task sequence, and a subsequent task of the predefined dynamic task sequence is conditioned on a resolution of the uncertainty.

4. The apparatus of claim 1, wherein:
an autonomous mobility agent of the multiple agents comprising a second processor configured to generate a representation for the human agent of how the predefined dynamic task sequence is projected to resolve the condition, wherein the autonomous mobility agent is remote from the AV.

5. The apparatus of claim 4, wherein:
the representation comprises projected positions for the AV while the condition is being resolved overlaying an image of a portion of the vehicle transportation network.

6. The apparatus of claim 1, further comprising:
an autonomous mobility agent of the multiple agents comprising a second processor configured to:
receive a request for assistance from the AV; and
responsive to the request, generate a window on a display for confirmation of the request by the human agent, and transmit data associated with the condition to the human-autonomy teaming manager, wherein the autonomous mobility agent is remote from the AV.

7. The apparatus of claim 1, wherein each of the plurality of predefined dynamic task sequences, when managed by the human-autonomy teaming manager, delegates a task to the human agent.

8. The apparatus of claim 1, wherein the condition comprises one of a plurality of conditions including an emergency condition of the AV, a behavioral condition of an occupant of the AV, or a driving condition of the AV.

9. The apparatus of claim 1, wherein the dialogue window includes a consequence of executing the predefined dynamic task sequence.

10. The apparatus of claim 1, wherein the dialogue window includes a search function that can locate the predefined dynamic task sequence.

11. An apparatus for traversing a vehicle transportation network by an autonomous vehicle (AV), comprising:
an autonomous mobility agent remote from the AV and comprising a first processor configured to:
receive a request for remote assistance support from the AV responsive to a condition observed by the AV while traversing from a starting location to an ending location within the vehicle transportation network; and
a human-autonomy teaming manager remote from the AV, wherein the first processor is configured to, responsive to the request, call the human-autonomy teaming manager to select a predefined dynamic task sequence, and the human-autonomy teaming manager comprising a second processor configured to:
select the predefined dynamic task sequence that is one of a plurality of predefined dynamic task sequences using multiple agents to resolve the condition, the multiple agents including a human agent and the autonomous mobility agent;
present a dialogue of the predefined dynamic task sequence to the human agent at a user interface of the human-autonomy teaming manager, wherein a first task of the dialogue prompts the human agent to confirm the predefined dynamic task sequence as a selected predefined dynamic task sequence or select an other predefined dynamic task sequence of the plurality of predefined dynamic task sequences as the selected predefined dynamic task sequence;
provide, to the user interface, access to a library through a dialogue window, wherein the library stores available predefined dynamic task sequences including the plurality of predefined dynamic task sequences, and the library is stored in a memory of the human-autonomy teaming manager;
receive, from the user interface, an input responsive to the dialogue, wherein the input confirms the predefined dynamic task sequence as the selected predefined dynamic task sequence or selects the other predefined dynamic task sequence of the plurality of predefined dynamic task sequences within the library as the selected predefined dynamic task sequence; and
manage the selected predefined dynamic task sequence by delegating tasks of the selected predefined dynamic task sequence to resolve the condition, wherein the selected predefined dynamic task sequence includes at least one conditional task.

12. The apparatus of claim 11, wherein:
the human-autonomy teaming manager delegates a task of the selected predefined dynamic task sequence to the human agent, the task comprising to label the condition for input to a machine-learning algorithm.

13. The apparatus of claim 11, wherein:
the human-autonomy teaming manager delegates a task of the selected predefined dynamic task sequence to the autonomous mobility agent, the task comprising to instruct additional autonomous vehicles regarding their actions responsive to the condition.

14. The apparatus of claim 11, wherein:
the human-autonomy teaming manager delegates a task of the selected predefined dynamic task sequence to the autonomous mobility agent, the task comprising to remotely control the AV.

15. A method for traversing a vehicle transportation network by an autonomous vehicle (AV), comprising:
selecting, by a first processor of a human-autonomy teaming manager, a predefined dynamic task sequence that is responsive to a condition experienced by the AV while traversing from a starting location to an ending location within the vehicle transportation network, wherein the condition results in a request for assistance from the AV, the predefined dynamic task sequence is one of a plurality of predefined dynamic task sequences using multiple agents to resolve the condition;
providing, to an interface accessible to a human agent of the multiple agents, access to a library through a dialogue window, wherein the library stores available predefined dynamic task sequences including the plurality of predefined dynamic task sequences;
receiving, from the interface accessible to the human agent, an input responsive to the dialogue, wherein the input confirms the predefined dynamic task sequence as a selected predefined dynamic task sequence or selects another predefined dynamic task sequence of the plurality of predefined dynamic task sequences within the library as the selected predefined dynamic task sequence; and managing, by the first processor, the selected predefined dynamic task sequence to resolve the condition, wherein the selected predefined dynamic task sequence includes a set of interactive tasks that includes at least one conditional task triggered by events along a progress of the selected predefined dynamic task sequence to resolve the condition.

16. The method of claim 15, wherein managing the selected predefined dynamic task sequence to resolve the condition comprises:
delegating at least one task of the selected predefined dynamic task sequence to the AV, the AV being one of the multiple agents.

17. The method of claim 15, wherein the dialogue includes a task for the human agent.

18. The method of claim 15, wherein the condition is one of a plurality of conditions, each of the plurality of conditions having a respective plurality of available predefined dynamic task sequences that use the multiple agents to resolve the condition.

19. The method of claim 15, further comprising:
receiving, by a second processor of an autonomous mobility agent of the multiple agents, a request for assistance from the AV triggered by the condition;
generating, by the second processor, a window on a display for confirmation of the request by the human agent; and
transmitting, from the autonomous mobility agent, data associated with the condition to the human-autonomy teaming manager for selection of the predefined dynamic task sequence, wherein initiating the dialogue is responsive to the autonomous mobility agent receiving the confirmation of the request by the human agent.

20. The method of claim 15, further comprising:
generating a representation, viewable to the human agent, of how the predefined dynamic task sequence is projected to resolve the condition.

* * * * *